(12) United States Patent
Rust et al.

(10) Patent No.: US 12,372,961 B2
(45) Date of Patent: Jul. 29, 2025

(54) CURVATURE SENSING AND GUIDANCE CONTROL SYSTEM FOR AN AGRICULTURAL VEHICLE

(71) Applicant: Raven Industries, Inc., Sioux Falls, SD (US)

(72) Inventors: Matthew K. Rust, Sioux Falls, SD (US); David Alan Rislov, Sioux Falls, SD (US); Jonathan Eugene Mathews, Rapid City, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 184 days.

(21) Appl. No.: 18/058,669

(22) Filed: Nov. 23, 2022

(65) Prior Publication Data
US 2023/0229163 A1    Jul. 20, 2023

Related U.S. Application Data

(60) Provisional application No. 63/283,078, filed on Nov. 24, 2021.

(51) Int. Cl.
*G05D 1/00* (2024.01)
*A01B 69/04* (2006.01)

(52) U.S. Cl.
CPC ......... *G05D 1/0088* (2013.01); *A01B 69/008* (2013.01); *G05D 1/0212* (2013.01)

(58) Field of Classification Search
None
See application file for complete search history.

(56) References Cited

U.S. PATENT DOCUMENTS 9,921,064 B2   3/2018  Schleicher
2011/0015817 A1  1/2011  Reeve
(Continued)

FOREIGN PATENT DOCUMENTS

WO   WO-2023097294 A1   6/2023

OTHER PUBLICATIONS

Furioli et al., "Automatic Steering Control for Agricultural Tractors in Vineyards", 2021 IEEE Conference on Control Technology and Applications (CCTA), Aug. 8-11, 2021, pp. 271-276 (Year: 2021).*
(Continued)

*Primary Examiner* — Tamara L Weber
(74) *Attorney, Agent, or Firm* — Schwegman Lundberg & Woessner, P.A.

(57) ABSTRACT

An autonomous vehicle control system includes one or more sensors configured for coupling with an agricultural vehicle, the one or more sensors configured to determine kinematics of the agricultural vehicle relative to a crop row. The system includes a guidance control module configured to coordinate steering of one or more steering mechanisms of the agricultural vehicle. The guidance control module includes a sensor input configured to receive kinematics of the agricultural vehicle, a vehicle kinematics comparator configured to determine one or more error values using the received vehicle kinematics, a crop curvature generator configured to determine crop row curvature using the one or more error values, and a steering interface configured to provide instructions to a vehicle steering controller to guide the agricultural vehicle using the crop row curvature.

18 Claims, 18 Drawing Sheets

(56) References Cited

U.S. PATENT DOCUMENTS

2018/0325012 A1* 11/2018 Ferrari ................. A01B 69/001
2020/0100422 A1* 4/2020 Schleicher ............. B62D 6/005
2021/0000004 A1 1/2021 Robinson
2021/0195824 A1 7/2021 Van Roekel et al.
2022/0377962 A1* 12/2022 Susko ................. G06V 10/893

OTHER PUBLICATIONS

"International Application Serial No. PCT US2022 080451, International Search Report mailed Mar. 13, 2023", 4 pgs.
"International Application Serial No. PCT US2022 080451, Written Opinion mailed Mar. 13, 2023", 5 pgs.
"International Application Serial No. PCT/US2022/080451, International Preliminary Report on Patentability mailed Jun. 6, 2024", 7 pgs.

* cited by examiner

CURVATURE SENSING AND GUIDANCE CONTROL SYSTEM FOR AN AGRICULTURAL VEHICLE

CLAIM OF PRIORITY AND INCORPORATION BY REFERENCE

This patent application claims the benefit under 35 U.S.C. § 119(e) of U.S. Provisional Patent Application 63/283,078, filed Nov. 24, 2021, the disclosure of which is hereby incorporated by reference herein in its entirety.

TECHNICAL FIELD

Embodiments described herein generally relate to automatic steering control of agricultural vehicles and more specifically to the determination of curvature of a crop row and incorporation of the curvature in steering control of an agricultural vehicle.

BACKGROUND

Modern agricultural operations generally include the use of agricultural vehicles (e.g., tractors, harvesters, sprayers, seeders, tillers, combines, automated vehicle platforms or the like) to process fields by planting, harvesting, or generally tending to a crop. Agricultural vehicles or agricultural machines include, in various examples, control systems that automate, or assist operators in, the execution of these operations. The steering control systems provide operators with information such as a direction or speed of the vehicle, agricultural implement data, or agricultural product application rate. These steering control systems also help agricultural vehicles navigate a field according to predetermined paths or trajectories (hereinafter, "guidance paths").

OVERVIEW/SUMMARY

In some situations, an agricultural vehicle that operates under the control of a steering control system can deviate from a guidance path. In these situations, the steering control system navigates the agricultural vehicle from an off-path position back toward the guidance path, for instance by way of feedback control based on a measured error. In one example crop rows correspond to a guidance path, for instance crop rows generally follow the contour of a guidance path and are, in some examples, considered equivalent or proximate to the guidance path (e.g., the space between crop rows). Some agricultural vehicles include sensors configured to ascertain two guidance parameters that are provided to the steering control system to identify deviations from a guidance path: track-angle error or heading error (TKE) and cross-track distance or position error (XTE). TKE corresponds to the angle between the forward direction of the agricultural vehicle (e.g., heading) and, for example, crop rows such that, when the agricultural vehicle is aligned with the crop rows the TKE is 0° and when the agricultural vehicle is moving perpendicular to the crop rows the TKE is 90°. Accordingly, the TKE is considered the current angle-of-attack for the agricultural vehicle moving toward one or more crop rows. The XTE distance is the lateral distance between the current position of the agricultural vehicle and the crop related row. Using TKE and XTE as parameters to the steering module enables a steering controller to guide an agricultural vehicle from an off-path position toward alignment with the guidance path when the off-path position is relatively close to the guidance path. In contrast, with off-line positions that are relatively far from a guidance path (conversely not proximate to the guidance path) the steering controller uses guidance parameters from other elements, such as positional data generated by a GPS device, to guide an agricultural vehicle from an off-path position toward the guidance path.

Some agricultural vehicles are configured to be driven in a single axle two-wheel active steering mode, a dual axle four-wheel active steering mode, or in a dual axle independent front and rear wheel active steering mode. The term active steering denotes an agricultural vehicle where driver or operator input and steering angle of an axle or set of wheels is continually adjusted, such as by a navigation controller. The navigation controller is generally configured to steer or navigate an agricultural vehicle in one of these steering modes.

The present inventors have recognized that, among other things, a problem to be solved includes enhancing steering controller performance in curved crop rows or furrows. Example automated steering systems provide steering control that does not incorporate crop row curvature. These example control systems use instantaneous corrections based on measured or sensed wheel position or orientation errors to navigate the agricultural vehicle. These systems fail to recognize crop row curvature, and accordingly rely on straight-row projection models. Significant discrepancies in estimating XTE and TKE are thereby encountered on curved rows, causing the path of the vehicle to deviate from the desired path, and resulting in overrunning of crop rows as a wheel of the vehicle crosses a crop row and crushes the crop. In some examples, the vehicle after having crushed the crop rows is now in a next furrow between crop rows instead of the original furrow and the entire vehicle has accordingly shifted one or more crop rows potentially negatively affecting coverage (e.g., of a sprayer boom, cultivator, harvester or the like). In some circumstances, the systems resume guidance in the next furrow instead of the original furrow and coverage is missed along one or more crop rows.

Accordingly in various examples, these steering controllers reduce productivity while also wasting resources such as agricultural products applied by the agricultural vehicle. In addition, these example steering controllers cause, in various examples, the yaw or horizontal rotation of the agricultural vehicle to change at a high rate. If the agricultural vehicle is equipped with a large implement that extends longitudinally from the vehicle, such as a large boom (e.g., sprayer boom, harvester head or the like), the yaw rate of the vehicle while conducting abrupt wheel angle changes causes whipping of the implement that stress the implement or cause vibrations or oscillations that waste agricultural product or damage the implement.

In other situations, the rear axle of an agricultural vehicle deviates from a guidance path while the front axle remains substantially on-line (e.g., on the guidance line). For instance, even with the front ground engaging elements of the front axle on-line, on a hill or during a turn the rear ground engaging elements will drift off-line through a proximate crop row and crush crops therein. A navigation controller corrects, in some examples, the deviation by temporarily steering the front axle moderately off-line (e.g., off of, or away from, the guidance line) while the agricultural vehicle drives a distance to correct the position of the rear axle. Correcting the position of the agricultural vehicle according to this technique, however, in some examples causes additional crop damage or reduces productivity due to the time the vehicle spends moving between off-line and on-line positions to adjust positioning of the rear axle and its rear ground engaging elements.

The present disclosure includes subject matter that provides solutions to these problems or challenges with a system that determines curvature of a crop row and uses the curvature as an input for enhanced vehicle guidance. Using the crop row curvature allows the system to make predictive changes based on upcoming crop row curvature instead of reactive changes to steering of the vehicle as the row curvature is encountered (e.g., as noted above other systems fail to recognize crop row curvature and accordingly behave as if the crop row is straight).

However, the inventors have appreciated that distances between sensors used to determine curvature (and other measurements) and the respective vehicle axles introduce additional guidance problems. For example, while curvature is accurately measured those measurements are conducted in a manner that presumes the axles are co-located with the sensors. Accordingly, curvature at the sensors may vary relative to the present curvature proximate to the axles. The present subject matter addresses this variation in curvature at the axles relative to the sensors by projection of measurements (such as XTE, TKE and row curvature) from the location of measurement, the sensors, to a respective axle (or axles). By projecting curvature measurements to the axles, the inventors have determined that previous navigation errors based on the position discrepancy are decreased (e.g., lowered or eliminated).

In some examples, the guidance controller determines row curvature (e.g., degrees per meter) and row curvature error, such as difference between a wheel angle or steering value and the row curvature in the field, and conducts vehicle guidance based on row curvature and row curvature error in addition to position error (XTE) and heading error (TKE). The determination of row curvature improves vehicle positioning at both vehicle axles. In addition, the projection of measured errors to the vehicle axles further improves the positioning of ground engaging elements between crop rows for both axles based on the projection of associated measured errors (in contrast to error measured at the sensors). The guidance controller including crop row curvature determination and optionally projection of the measured errors to one or more axles as described herein reduces crop row overrunning and damage, agricultural product waste and implement damage.

The disclosed guidance controller is configured to detect row curvature and correct measured TKE and XTE so that the corrected TKE and XTE more accurately represent where the vehicle should be steered in a row. In various embodiments, a curvature offset (or curvature error) is used in the projection of XTE and TKE, and the curvature offset, XTE and TKE are then used by a navigation controller (e.g., a state space controller), along with the current vehicle dynamics, to calculate a target curvature for use in vehicle guidance.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
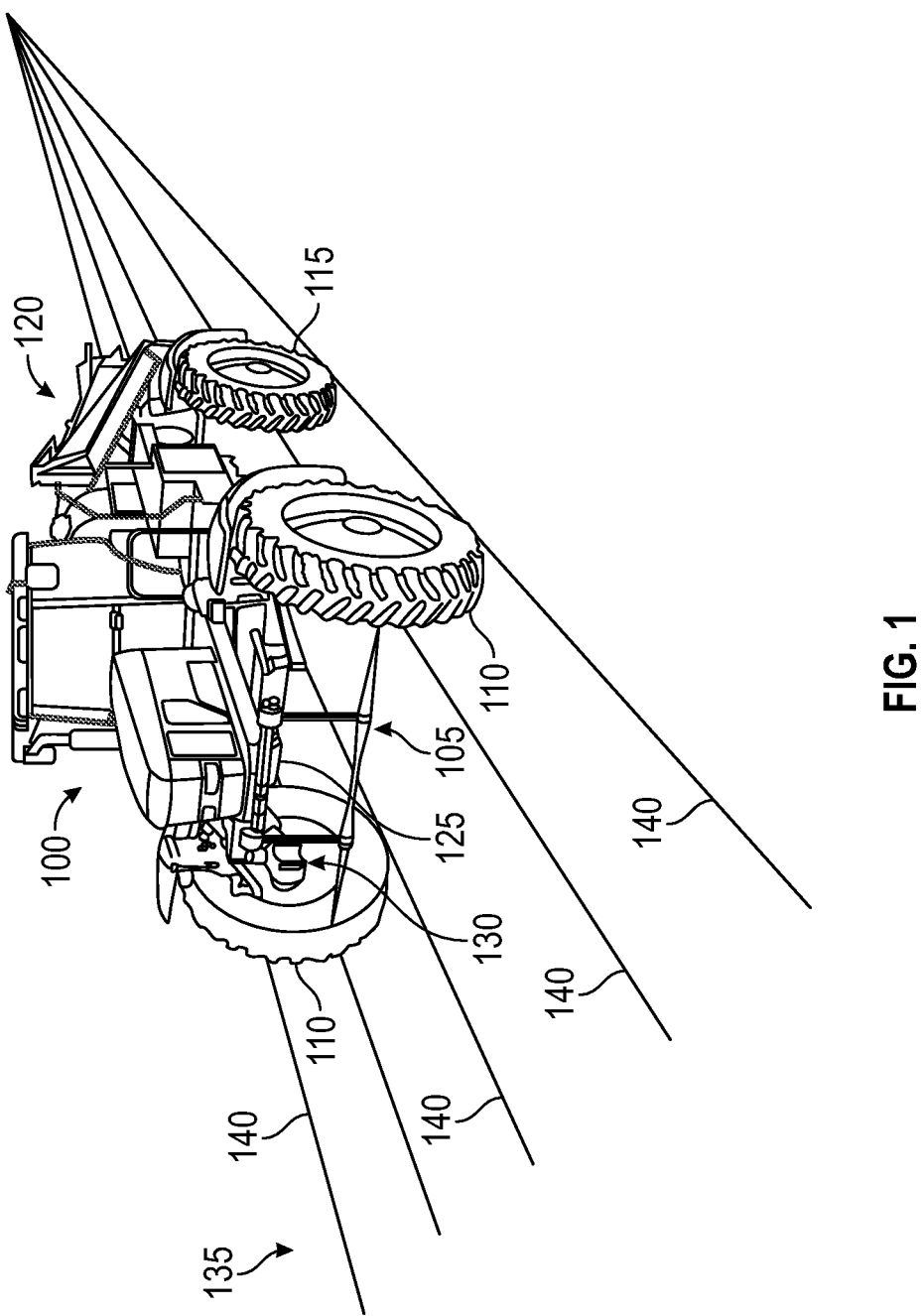
FIG. 1 is a diagram of an agricultural vehicle having a mechanical sensor system, according to various embodiments of the present subject matter.

The present disclosure includes subject matter that provides for determining curvature of a crop row and using the curvature as an input for enhanced vehicle guidance. For instance, the steering controller described herein generates crop row curvature using heading error and uses the crop row curvature as an input to a target vehicle curvature to reduce crop row overrunning and damage, agricultural product waste and implement damage.

Agricultural Vehicles and Steering

In an example, an agricultural vehicle (or agricultural machine) is provided for performing a task in a field. The vehicle may be any agricultural vehicle (hereinafter, "vehicle"), including combines, harvesters, planters, sprayers, tractors, trailing vehicles, or the like that traverse a field to perform a task. The tasks include, in various examples, harvesting, planting seeds, spraying crops, applying agricultural product, including but not limited to solid products including granular fertilizer, liquid products including fertilizers, herbicides, or pesticides.

The vehicle includes, in various examples, one or more control systems or vehicle controllers that are configured to guide the vehicle as it performs a task in a field. In an example, the control systems include a path planner that is configured to determine or provide a guidance path for the vehicle. The path planner provides a target heading or guidance line for the vehicle to follow as is traverses a field. In another example, the control systems include a steering controller that is configured to steer one or more axles or wheel (other ground engaging element) pairs of the vehicle to adjust the position or orientation of the vehicle according to a target heading or guidance line provided by the path planner. Although the present disclosure ascribes operations, features, modules, or components, to a particular controller, this is done for case of discussion and such operations, features, modules, or components are, in various examples, performed by, or is incorporated in, one or more of the controllers or control systems described herein.

The vehicle, in various examples, includes one or more sensors that are configured to measure, or to generate information that is indicative of, characteristics of the vehicle or an implement associated with the vehicle. The sensors include position or orientation sensors that are configured to measure the position or orientation of the vehicle in a field. Such sensors, in various examples, include global positioning systems sensors (GPS), optical sensors such as video or digital cameras, touchless sensors such as sonic and electromagnetic wave sensors, or tactile sensors. These sensors generate measurements or other information that are used by a control system to determine the heading error of the vehicle relative to a crop row or a guidance line. In an example, the sensors generate measurements that are useful for determining the heading error of a point on one or more axles of the vehicle or at any other point on the vehicle (e.g., control reference point). The sensors, in some examples, include behavioral sensors that measure the speed, acceleration, or yaw rate of the vehicle or any point on the vehicle.

The steering controller, in various examples, is configured to steer the vehicle from an off-line position (e.g., a position that the vehicle is not following, or is not on, a guidance line) along, for example, a curved or circular path toward a guidance line or an on-line position (hereinafter, "on-line" or "on-line position"). The steering controller receives a set of vehicle position, orientation, and behavior inputs, as wells as a guidance line parameter. The steering controller uses this information to steer or adjust the angle (e.g., the yaw) of one or more axles of the vehicle to adjust the position or orientation of the vehicle responsive to the guidance line parameter. In an example, the steering controller adjusts the position or orientation of the vehicle by generating a target curvature which is then converted to a steering angle for one or more axles or other steering mechanisms of the vehicle based on a particular vehicle model. The target curvature or steering angle is then provided to an actuator or a steering interface of one or more of the axles to steer the vehicle.

FIG. 1 is a view of an example of an agricultural vehicle 100 having a mechanical sensor 105. The agricultural vehicle 100 can include any vehicle or equipment that is configured to process a field, such as by planting, harvesting, or generally tending to a crop. Examples of such agricultural vehicles include tractors, planters, harvesters, irrigators, or fertilizers. As shown in FIG. 1, the agricultural vehicle 100 includes one or more ground engaging elements, such as front wheels 110 and rear wheels 115, and one or more agricultural implements, such as a sprayer boom 120. The ground engaging elements and the agricultural implements can each be coupled to the vehicle chassis 125 and may each be configured to actuate or articulate independently such chassis. In an example, the front wheels 110 are coupled to the chassis 125 though wheel assembly 130 and may be configured to articulate at one or more angles relative to the chassis. Similarly, the agricultural implement 120 can be coupled to the chassis 125 though an implement rack (not shown) and may be configured to independently extend, retract, fold, or rotate.

In some examples, the agricultural vehicle 100 includes a control module, such as a vehicle electronic controller unit (ECU) or other computing device, and one or more sensors, such as a visual sensor (e.g., a camera or other optical sensing device), a GPS sensor, and one or more angle or roll sensor. The visual sensor and the GPS sensor can each be coupled to the chassis 125 and configured to provide positional or navigation data that is usable by the control module to guide the agricultural vehicle 100 through the field 135. In an example, a GPS sensor can provide data that is indicative of the global position of the agricultural vehicle 100 in the field 135, while the visual sensors can provide more granular data that is useful for determining the position of the vehicle relative to crop rows 140.

Generally, the control module can use data provided by the aforementioned sensors to calculate the position of the agricultural vehicle 100, including, for example, calculating track-angle error and cross-track distances. However, as the crops that are disposed in crop rows 140 mature, foliage of these crops or other plants can create a canopy that obscures the field of view of visual sensors, thereby introducing errors or variances in the more granular position calculations of the control module. In these situations, additional sensors, such as mechanical sensors 105 can be used to provide data that is useful for determining the location of crop rows 140 or the vehicle position of the agricultural vehicle 100 relative to these crop rows. The mechanical sensors 105 can extend down from the chassis 125 below the crop canopy to determine the location of crop rows 140 by direct engagement with the crops. Such direct engagement, however, can damage the crops and cause mechanical wear on the sensors, which may reduce the useful life of the sensor.

Figure 2A:
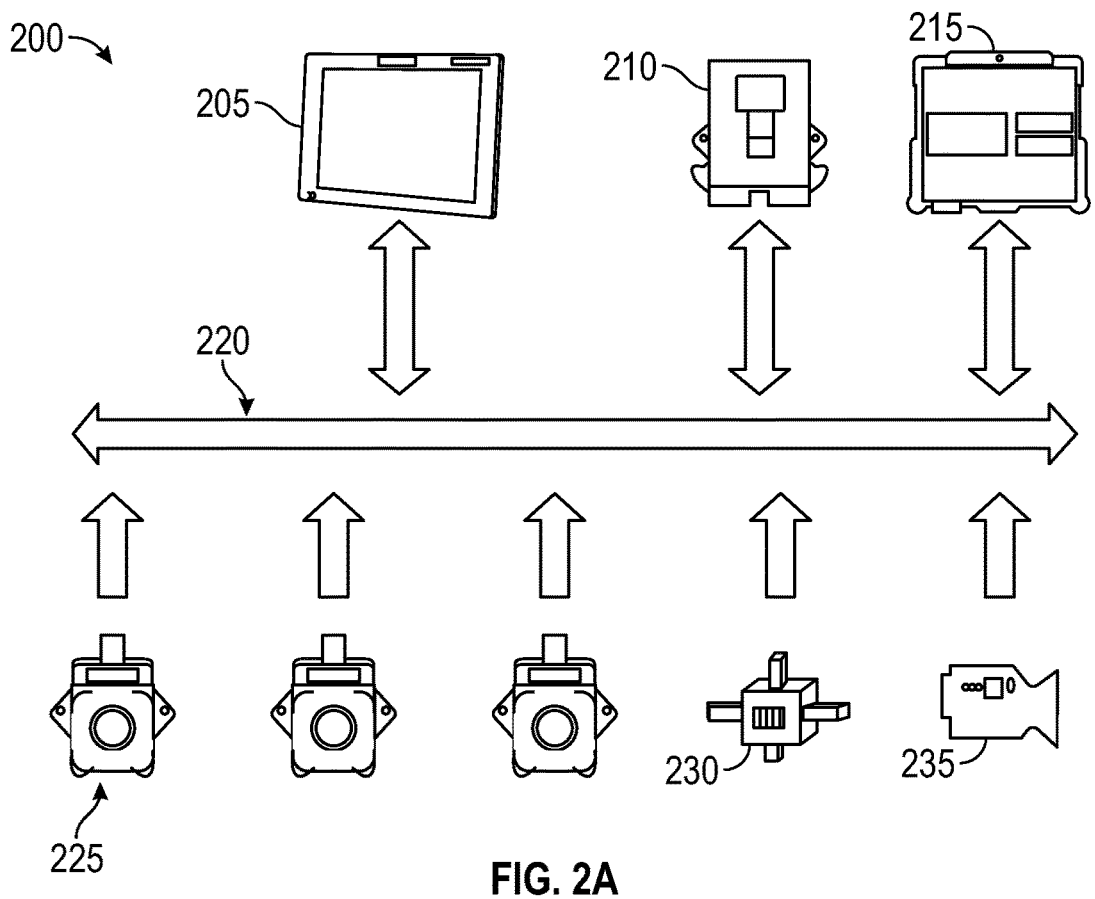
FIG. 2A is a diagram of an agricultural vehicle monitoring system, according to various embodiments of the present subject matter.

FIG. 2A is a diagram of an agricultural vehicle monitoring system 200. The agricultural vehicle monitoring system 200 can be useful in any of the agricultural vehicle described herein, such as the agricultural vehicle 100 (FIG. 1), and can include interface 205, comparative vehicle monitor 210, steering interface 215, noncontact sensors 225, roll sensor 230, and visual sensor 235. In an example, the agricultural vehicle monitoring system 200 includes, or is, an example of the control module described in the discussion of FIG. 1. The components of the agricultural vehicle monitoring system 200 can include one or more hardware circuits or software application for performing one or more of the operations or techniques described herein. Additionally, the components of the agricultural vehicle monitoring system 200 can communicate or exchange data over a communication fabric 220, such as a controller area network bus (CAN bus) or other wired or wireless vehicle communication infrastructure.

In operation, the agricultural vehicle monitoring system 200 can receive data from one or more sensors, such as the noncontact sensor 225, roll sensor 230, or visual sensor 235. The received data can be used to identify one or more crops or crop rows, or to determine a vehicle position (e.g., a location or heading) of an agricultural vehicle. In an example, the agricultural vehicle monitoring system 200 can provide a determined vehicle position, such as in the form of a position of one or more vehicle wheels relative to a crop or a crop row, to an operator where it can be used to adjust the movement or guidance of an agricultural vehicle, such as to avoid or mitigate damage to crops. In another example, the agricultural vehicle monitoring system 200 can provide vehicle position to the steering interface 215 or other automated steering system to steer or guide an agricultural vehicle in a field, such as between crop rows or in furrows or row gaps.

The operator interface 205 can include one or more input or output devices, such as touchscreens, wireless device, smart phones, or any other computer interface that is configured to received or transmit instructions. In an example, the operator interface 205 provides steering cues or automated guidance directions based on a vehicle position determined by the agricultural vehicle monitoring system 200.

The steering interface 215 can include one or more control circuits or software applications that are configured to receive vehicle position data, such as from the agricultural vehicle monitoring system 200, and use this data to automatically steer or guide an agricultural vehicle along a path through a field. In an example, the steering interface 215 can steer an agricultural vehicle along a specified path or to a specified position within a furrow or a crop row gap. Such paths or positions can be in the middle of a crop row gap, or proximate to a first crop row and remote to a second crop row, such as to adjust for an inclined or declined terrain.

Noncontact sensors 225 can include one or more radar, ultrasound, light detection and ranging (LIDAR) sensor, other time of flight sensors, or any camera or camera type sensor. These noncontact sensors can be coupled to an agricultural implement or to the chassis, wheel, or wheel assembly of an agricultural vehicle to provide data that is useful to determine vehicle position relative to a crop or crop row. In an example, such data can be provided to supplement or enhance the confidence in other data used to determine vehicle position. In other examples, such data can improve the resolution of vehicle position determinations.

Roll sensor 230 can include one or more angular or inertial sensor that is configured to generate data that is useful for measuring or determining the orientation or yaw rate of an agricultural vehicle. In an example an inertial sensor can generate data this is useful for determining the roll of an agricultural vehicle (e.g., the orientation of the vehicle chassis), such as while the agricultural vehicle is traversing inclined or declined terrain. The data generated by the roll sensor 230 can be used to refine vehicle position determinations and to improve the resolution of corresponding vehicle guidance, such as mitigate damage to crops that are disposed on a side of a hill or in rows obscured by foliage.

The visual sensor 235 can include one or more video cameras or other optical sensors that are configured to provide data that is useful for local navigation or vehicle position determination of an agricultural vehicle, such as by enhancing the determination of vehicle position relative to a crop or crop row.

Figure 2B:
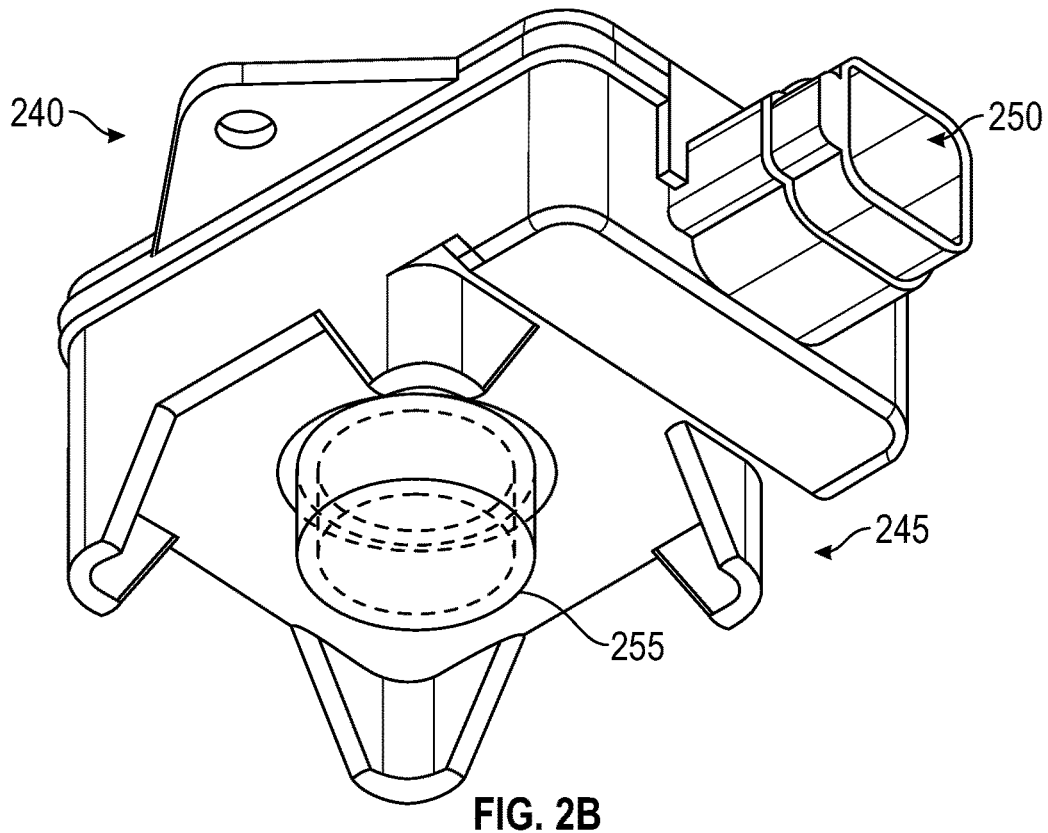
FIG. 2B is a diagram of a noncontact sensor, according to various embodiments of the present subject matter.

FIG. 2B is a diagram of a noncontact sensor 240. The noncontact sensor 240 can include an example of the noncontact sensor 225, or any other sensor for remotely measuring distance to one or more objects. Noncontact sensor 240 can include a sensor housing 245, a power and data port 250, and a sensor emanator 255.

The sensor housing 245 can include any structure for encasing or housing the noncontact sensor 240, such as a case that is configured for mounting the noncontact sensor to an agricultural implement or an agricultural vehicle (e.g., the chassis, wheel, or wheel assembly of the agricultural vehicle). Such mounting can include coupling the noncontact sensor 240 to an agricultural vehicle or implement at a specified location above the ground or surface of a field but below the canopy of a crop.

The power and data port 250 can include one or more electrical, optical, or electromagnetic terminals that are configured to interface with a power supply and one or more components of the agricultural vehicle monitoring system 200, such as the comparative vehicle monitor 210. The noncontact sensor 240 can relay data that is indicative of sensor measurements and sensor confidence to the comparative vehicle monitor 210, such as by way of wired connection at the power and data port 250 or a wireless interface coupled at the power and data port.

The sensor emanator 255 can include an opening in the sensor housing 245, such as for transmitting (e.g., emitting) or receiving a sensor energy or sensor signals (e.g., a scan line signal). In an example, the sensor emanator 255 includes one or more sensor elements (e.g., a scan line generator), such as radar, light, ultrasound generating elements, that are configured to generate a corresponding energy (e.g., an electromagnetic, optical, or mechanical signal) and direct the energy toward objects of interest (e.g., stalks of one or more crops), In an example, such energy is directed perpendicular to objects of interest and parallel to the field or ground. In another example, such energy is directed in any direction that traverses (e.g., crosses or moves through) objects of interests. The sensor emanator 255 can also include a receiver (e.g., a scan line receiver) configured to receive reflected energy after engagement with objects of interest and convert the reflected energy into a signal, such as a signal corresponding to either of a crop or a row distance. In an example, a separate receiver is proximate to the noncontact sensor 240 and receives the reflected energy and converts the energy into the signal.

The sensor emanator 255 can include two or more sensor elements, each calibrated to measure the distance to an object, such as stalks of one or more plants. Optionally, the sensor emanator 255 includes a ping element, such as a radar generator, configured to emit radio frequency energy that partially reflects from a first object, such as a first crop stalk, and reflects from additional objects, such as other crop stalks disposed, relative to the sensor emanator 255, behind the first crop stalk. The reflected energy can be interpreted, such as at the sensor 240, and provided, such as to the comparative vehicle monitor 210, as a signal indicating distance measurements to a one or more objects.

Figure 3:
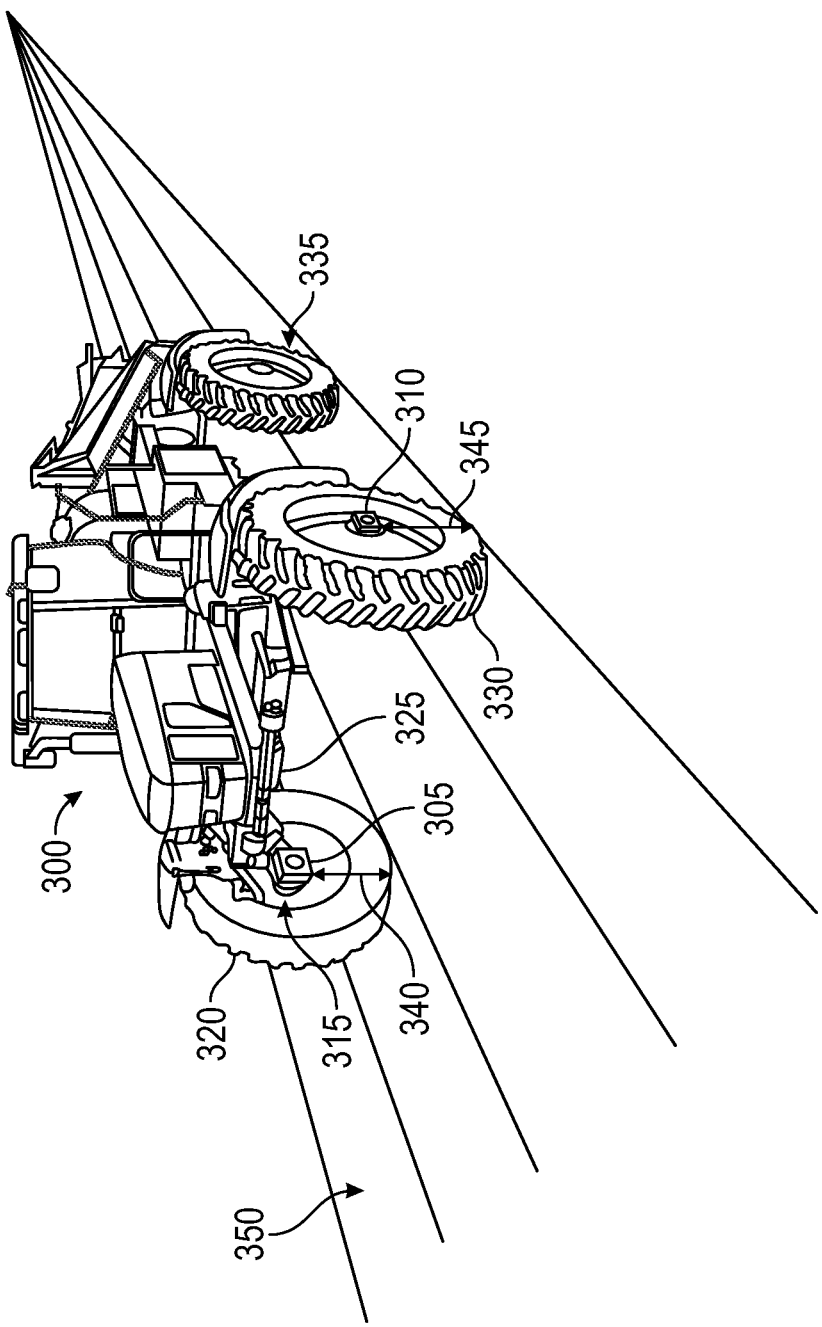
FIG. 3 is a diagram of noncontact sensors coupled to a wheel base of an agricultural vehicle, according to various embodiments of the present subject matter.

FIG. 3 is a diagram of a vehicle 300 (here an agricultural vehicle) including noncontact sensors coupled to a wheel of the vehicle. The agricultural vehicle 300 can include an example of the agricultural vehicle 100, as shown in FIG. 1, where the mechanical sensors 105 are replaced by the noncontact sensors 305 or 310. The noncontact sensors 305 and 310 can include examples of the noncontact sensor 225 (FIG. 2A) or the noncontact sensor 240 (FIG. 2B).

As shown in FIG. 3, one or more noncontact sensors 305 can be coupled to a wheel assembly 315 of the wheel 320. In example, the noncontact sensor 305 is configured (e.g., oriented) to generate a scan line signal in a direction towards wheel 330, such as to detect crops or crop rows under the chassis 325. In another example, the noncontact sensor 305 is configured (or oriented) to generate a scan line (e.g., a scan line signal) in a forward oriented direction, such as towards the front of the chassis 325 or towards the front of the wheel 330 (or any other wheel of agricultural vehicle 300). The scan line can be used to detect crops or crop rows ahead of the agricultural vehicle 300. In another example, the noncontact sensor 305 includes two distinct noncontact sensors or a single noncontact sensor having two sensor emanators and receivers. A first sensor emanator, or a first noncontact sensor, can be directed in a direction towards the wheel 330 or in a forward direction towards the front of the chassis 325 or the front of the wheel 330. Such a configuration can be useful for generating two or more scan lines which originate at a single location and are directed in a forward oriented direction and in a rearward (or aft or backward) oriented direction. Such scan lines can be useful for determining vehicle position using scan line data generated from a single crop row, as described herein. In another example, the wheel 330 includes a noncontact sensor disposed in any of the previously discussed configurations.

A noncontact sensor, such as the noncontact sensor 310, can be coupled to the outside of the wheel 320 or the wheel 330, such as to generate scan lines on opposing sides of the agricultural vehicle 300.

The noncontact sensor 305 or 310 can be coupled to the wheel 320 or 330 at a height 340 or 345 above the field 350, such as by coupling the sensors at a location that is offset from the center of the wheels 320 and 330. In an example, height 340 or 345 is lesser than a height crop canopy formed by crops in the field 350.

In an example, noncontact sensors, such as the noncontact sensors 305 or 310, can be coupled to the rear wheels 335 in any of the previously discussed configurations.

Figure 4:
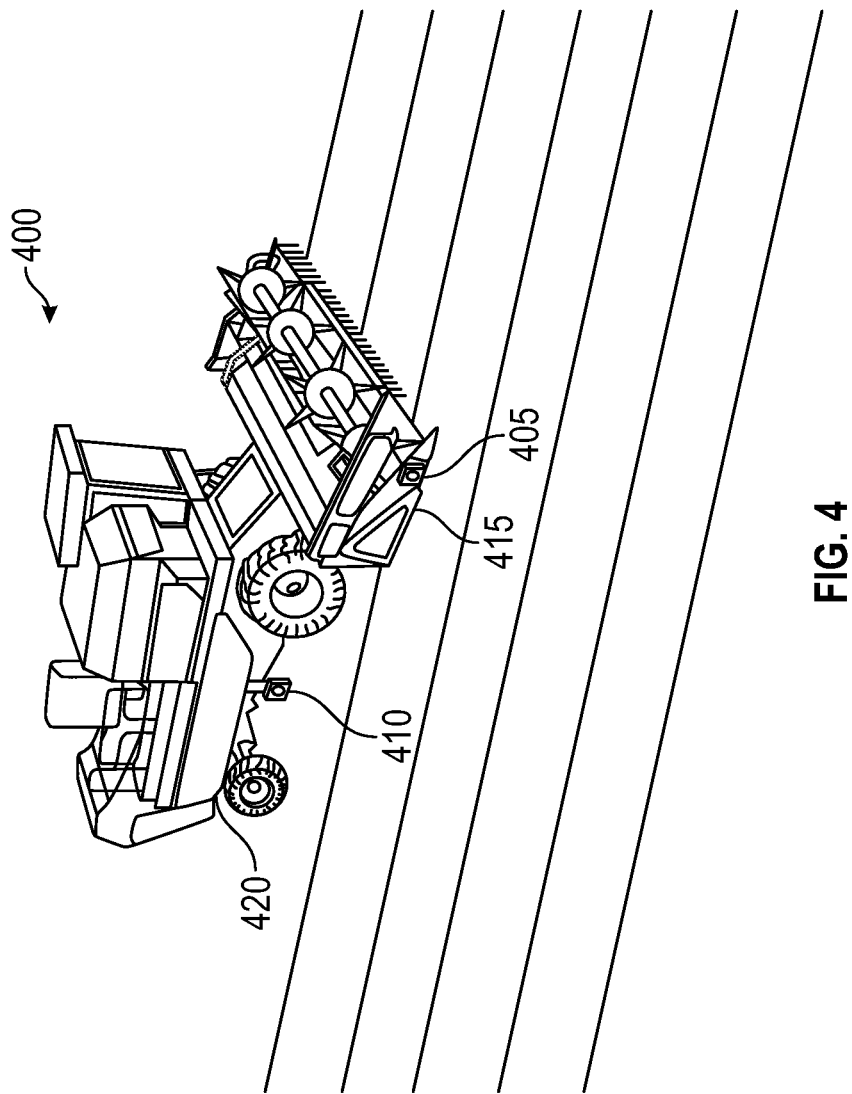
FIG. 4 is a diagram of noncontact sensors coupled to a chassis and an agricultural implement of an agricultural vehicle, according to various embodiments of the present subject matter.

FIG. 4 is a diagram of an example of noncontact sensors 405 and 410 coupled, respectively, to an agricultural implement 415 and a chassis 420 of an agricultural vehicle 400. The agricultural vehicle 400 can include an example of the agricultural vehicle 300, as shown in FIG. 3. As shown in FIG. 4, the noncontact sensors 405 and 410 are oriented to generate scan lines to detect crops or crop rows that are proximate to the agricultural vehicle 400 or the agricultural implement 415. The returned scan line data (e.g., energy, timing, or object distance data) or crop row distance data from the noncontact sensors 405, 410 installed at these locations is used, as described herein, in determining the position of the agricultural vehicle 400 or the implement 415 relative to a crop or a crop row.

Figure 5:
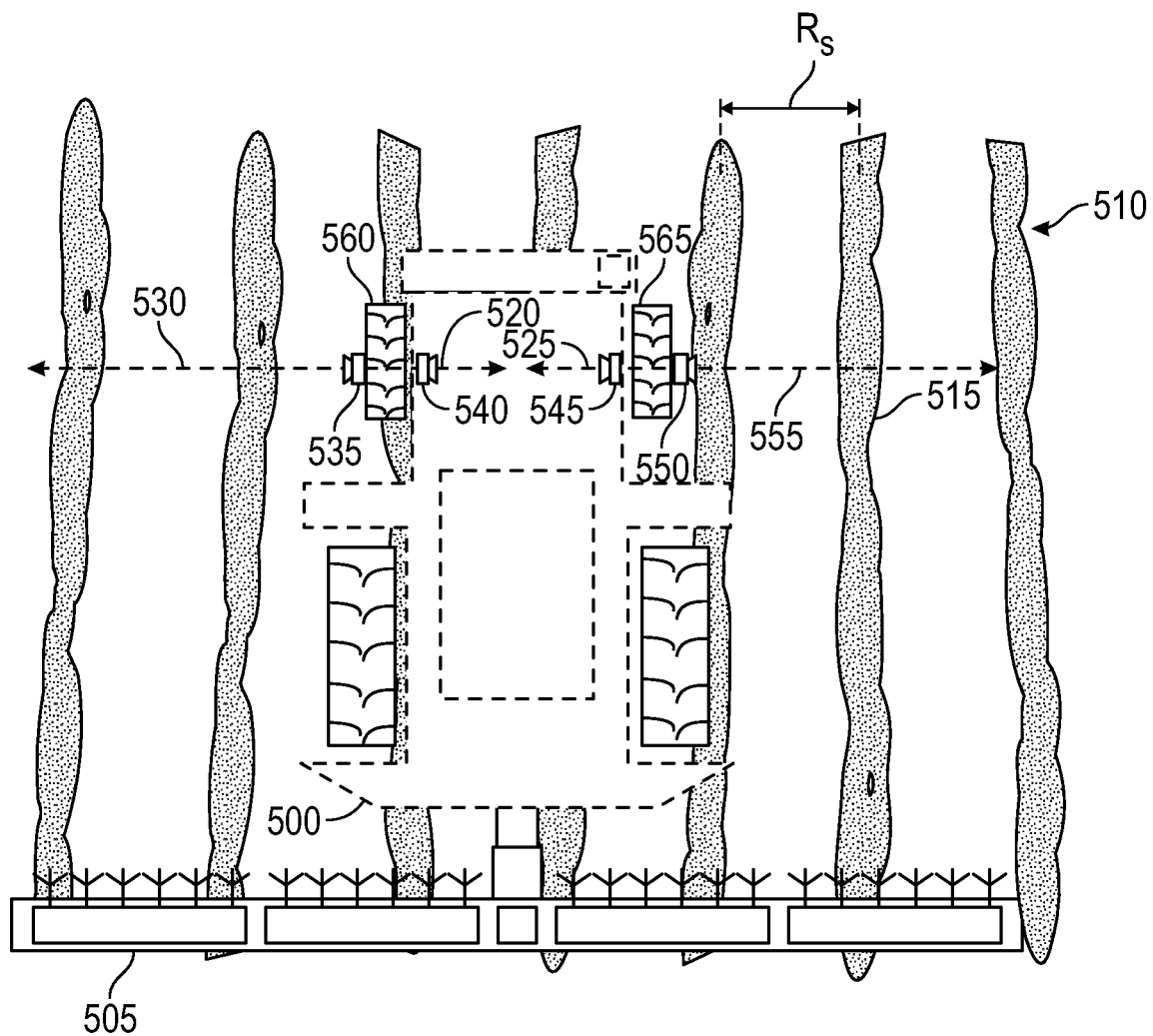
FIG. 5 is a diagram of configurations of noncontact sensors on an agricultural vehicle, according to various embodiments of the present subject matter.

FIG. 5 is a diagram of configurations of noncontact sensors on an agricultural vehicle 500. The agricultural vehicle 500 optionally includes components (e.g., sprayer booms, sprayer nozzles or the like) similar to the agricultural vehicle 300 shown in FIG. 3. For instance, the vehicle 500 includes an agricultural implement 505, such as the agricultural implement 120 (e.g., a sprayer). In an example, the agricultural vehicle 500 is configured to process a field 510, such as applying an agricultural produced using the agricultural implement 505. As shown in FIG. 5, the field 510 includes one or more crop rows 515 with foliage (indicated by the stippled zones). Foliage includes, but is not limited to, leaf collars, crop canopy, weeds, silk or the like. Foliage, in some examples, obscures identification of crops or crop rows (e.g., the center of the crop rows for instance corresponding to stalks of the crop).

As shown in FIG. 5, the agricultural vehicle 500 includes one or more noncontact sensors. In the example shown, the vehicle 500 includes noncontact sensors 535, 540, 545, or 550. The sensors are directed laterally (e.g., transverse to the crop row orientation, perpendicular, at angles relative to the crop row or forward direction of the vehicle, orthogonally or the like) relative to agricultural vehicle 500. The sensors, in other examples, are directed forward or backward relative to the front of the agricultural vehicle 500. In each of these examples, the sensors are directed laterally (e.g., at an angle relative to the front of the vehicle, forward direction of the vehicle, direction of the crop rows or the like).

The sensors are coupled or mounted proximate the wheel assemblies of the agricultural vehicle 500. In a first example, the sensor 540 or 545 is oriented inward (e.g., another example of lateral orientation) under the chassis towards the wheel 560 or the wheel 565, and generates inward directed scan lines 520 or 525. In another example the sensor 535 or 550 is directed away from the agricultural vehicle 500 (another example of lateral orientation), and generates outward directed scan lines 530 or 555. In each of these configurations, scan lines are delivered laterally relative to the heading of the vehicle, in a forward or rearward oriented direction relative to the front of the vehicle (another example of lateral direction). The sensors and their associated scan lines detect portions of crops or crop rows below the crop canopy, or that present a smaller leaf profile to the sensors than a leaf profile presented by the crop canopy.

In the configuration where the noncontact sensors 540 or 545 are directed inward under the vehicle chassis, the sensors and associated scan lines (by way of the returned scan line data) detect the opposed wheel and one or more intervening crop rows (e.g., the distances to, or the positions of, the crop rows) along the scan line 520 or 525. As described herein, the scan line data from the noncontact sensors 540, 545 is used, along with a known mounting position of the noncontact sensors (e.g., the sensor mounting angle), to enhance guidance of the agricultural vehicle 500. For instance, the noncontact sensors and the associated control systems described herein facilitate the guidance of the vehicle wheels to specified positions (e.g., symmetrically or biased toward a side of the row if on a grade) between crop rows as the vehicle traverses the field 510. The guidance provided by way of the noncontact sensors and the associated control system reduces (e.g., decreases or eliminates) contact with the crop rows 515, thereby reducing overrunning or damaging such crops. The noncontact sensors 535 and 545 can similarly provide scan line data that is indicative of one or more crops or crop rows, such as crops or crop rows that are disposed proximate to the agricultural vehicle 500. Such crop rows can be separated by row spacing $R_s$. In some examples, the row spacing $R_s$ is a distance between the center line of two adjacent crop rows. In certain examples $R_s$ is substantially constant for crops in a field.

In some examples, scan line data generated by noncontact sensors 535, 540, 545, or 550 is optionally filtered. As described herein, filtering includes one or more of removing noise caused by weeds or other plants beyond the crop, or removing values outside of a specified or calculated threshold value, such as crop row width. In other examples described herein, data generated along scanlines 520 and 525 or along scan lines 530 and 555 is weighted and combined according to a specified crop row width, or a crop row width calculated using scan line data. In certain examples also described herein, scan line data generated from two opposing noncontact sensors is compared according to a statistical central tendency of the scan line data or according to a specified or calculated crop row width, and the result of such comparison can be used to select a sensor or scan line data to determine a vehicle position or for vehicle guidance.

Figure 6A:
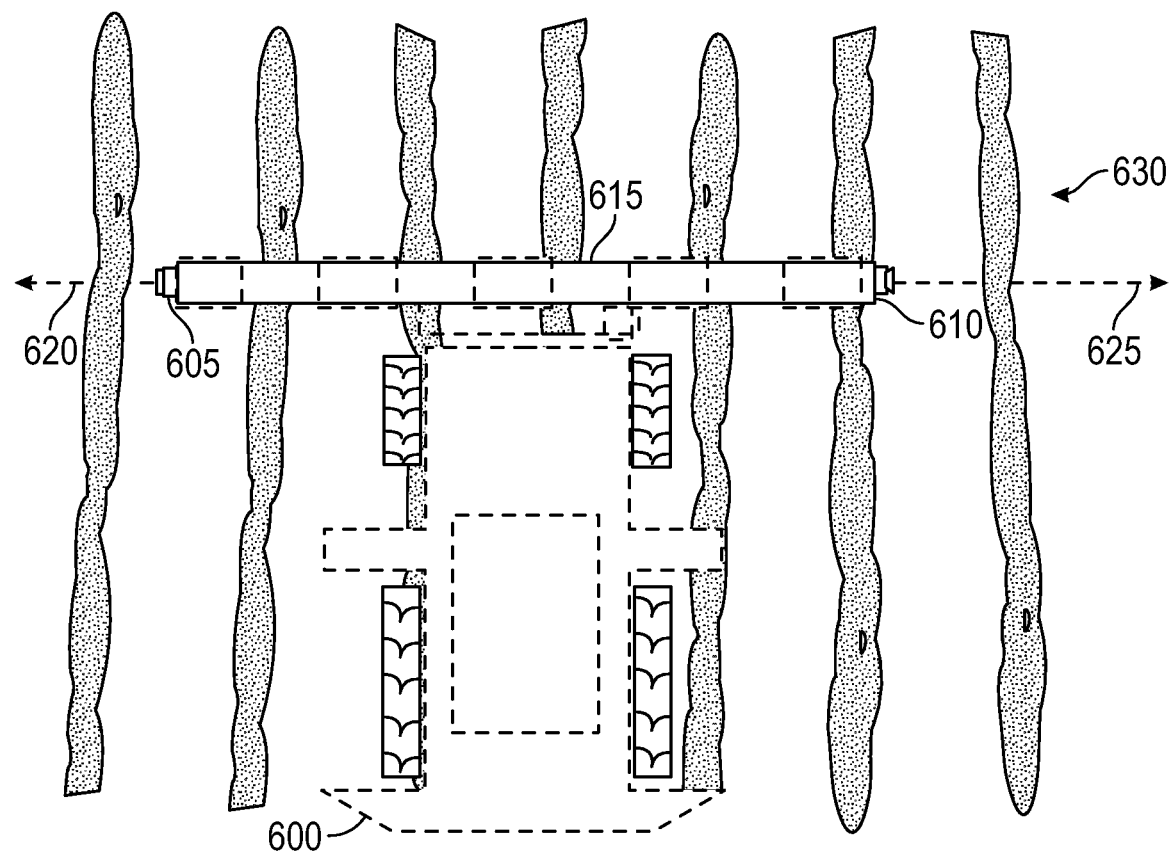
FIG. 6A is a diagram of an agricultural vehicle that is configured with an agricultural implement that includes noncontact sensors, according to various embodiments of the present subject matter.

FIG. 6A is a diagram of an example of an agricultural vehicle 600 having an agricultural implement 615 that includes noncontact sensors 605 and 610. The agricultural vehicle 600 includes any of the vehicles described herein and their equivalents. As shown in FIG. 6A, the noncontact sensors 605 and 610 are configured to generate one or more lateral scan lines 620 and 625 directed from the implement 615. Scan line data generated according to one or more of these scan lines 620, 625 is used to determine the position of either or both of the implement 615 or the position of agricultural vehicle 600 relative to the crops or crop rows 630, as will be described herein.

Figure 6B:
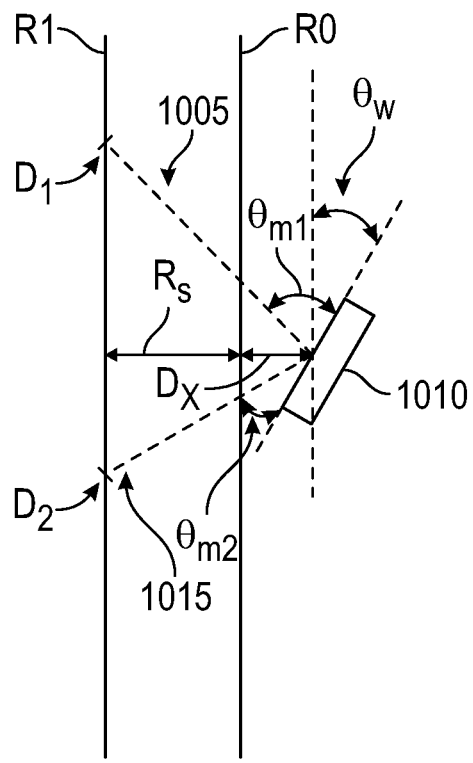
FIG. 6B is an example of a diagram that is useful in a technique for determining a vehicle position of an agricultural vehicle according to two scan lines associated with an agricultural vehicle at a location proximate to a crop row, according to various embodiments of the present subject matter.

FIG. 6B is an example diagram useful in a technique for determining a position of an agricultural vehicle according to two scan lines 1005 and 1015 associated with an agricultural vehicle at a location proximate to a crop row. In an example, the scan lines 1005 and 1015 are generated by a single noncontact sensor configured to generate multi-directional (e.g., forward or fore and rearward or aft) oriented scan lines that also include lateral direction components. In another example, the scan lines 1005 and 1015 are generated by at least two noncontact sensors mounted at a common location on the vehicle element 1010, such that a first sensor of the at least two sensors is oriented in a first or forward (and lateral) direction and a second sensor of the at least two sensors is oriented in a second or rearward or aft (and lateral) direction. As described herein, the noncontact sensor collects and delivers data that is indicative of the distance $D_1$ from the vehicle element 1010 to crop row R1 along the forward oriented scan line 1005 and the distance $D_2$ from the vehicle element to the crop row R1 along the rearward oriented scan line 1015. The row width $R_s$ and the noncontact sensor mounting angles $\theta_{m1}$ and $\theta_{m2}$ are obtained through calibration or from user input, as described herein. The distance $D_x$ from vehicle element 1010 (e.g., the ground engaging element, wheel or the like) to the crop row R0 and the angle $\theta_w$ of the vehicle element relative to the crop row R0 are determined according to equations (3), (4) and (5):

$$D_x = \frac{D_1 D_2 \sin(180° - \theta_{m1} - \theta_{m2})}{\sqrt{D_1^2 + D_2^2 - 2D_1 D_2 \cos(180° - \theta_{m1} - \theta_{m2})}} \% R_s \quad (3)$$

$$\theta_w = 90° - \theta_{m2} - \cos^{-1}\left(\frac{D_1 \sin(180° - \theta_{m1} - \theta_{m2})}{\sqrt{D_1^2 + D_2^2 - 2D_1 D_2 \cos(180° - \theta_{m1} - \theta_{m2})}}\right) \quad (4)$$

$$\theta_w = 90° + \theta_{m1} - \cos^{-1}\left(\frac{D_2 \sin(180° - \theta_{m1} - \theta_{m2})}{\sqrt{D_1^2 + D_2^2 - 2D_1 D_2 \cos(180° - \theta_{m1} - \theta_{m2})}}\right) \quad (5)$$

where $\theta_{m1}$ and $\theta_{m2}$ are the respective mounting angles of the one or more noncontact sensors, and the remaining variables are obtained or defined as previously described herein.

Figure 6C:
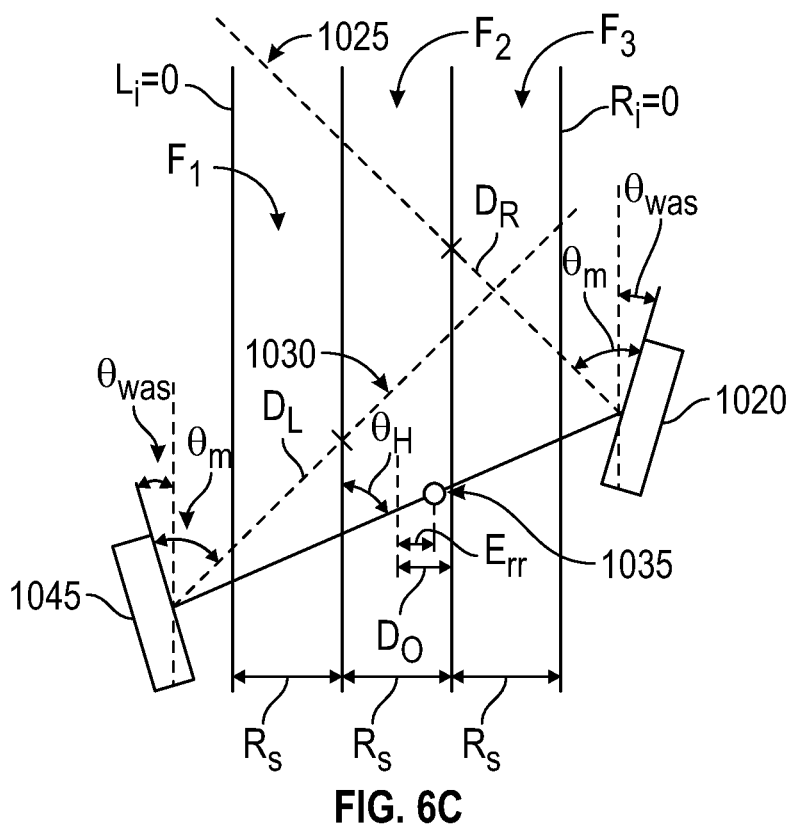
FIG. 6C is an example of a diagram that is useful in a technique for determining a vehicle position of an agricultural vehicle according to two scan lines generated from two wheels of an agricultural vehicle, according to various embodiments of the present subject matter.

FIG. 6C is an example diagram useful in a technique for determining a vehicle position of an agricultural vehicle according to two scan lines generated from two opposing vehicle elements, such as wheels 1020 and 1045 (other example vehicle elements include implement components, portions of the chassis or ground engaging elements like the wheels, tracks or the like) of an agricultural vehicle. The agricultural vehicle includes, but is not limited to, the vehicles described herein and their equivalents. In an example, the vehicle position of the agricultural vehicle (e.g., one or more of the location or orientation of the agricultural vehicle relative to a crop row) is determined as an offset error distance $E_{rr}$ of a specified point 1035 (e.g., an index marker, fiducial marker or the like) on the agricultural vehicle from a target offset $D_o$. In one example, the target offset $D_o$ includes a specified offset from a crop row (e.g., a distance from the centerline of a crop row to a center portion of an intervening crop furrow). In another example, the vehicle position of the agricultural vehicle is determined as a heading error $\theta_H$ of a portion of vehicle (such as an axle, chassis location) relative to a crop row. In an example, the specified point 1035 is a center point of the chassis between a right wheel 1020 and a left wheel 1045, and the target offset $D_o$ corresponds to a distance from a crop row (e.g., crop row R1 or crop row L2) to a point or position at a center line between crop rows (e.g., a center line between crop rows L1 and L2 or, equivalently, a center line between R1 and R2, and also a center portion of the intervening crop furrow $F_1$, $F_2$, $F_3$). Optionally, the target offset $D_o$ is varied, for instance based on a roll angle of the vehicle with respect to the crop rows.

In an example, this technique is used to guide an agricultural vehicle along a path at a specified offset (e.g., $D_o$) from a crop row (e.g., a center line of a crop row). According to this technique, the offset error $E_{rr}$ and the heading error $\theta_H$ are determined using a respective mounting angle $\theta_m$ of the noncontact sensors mounted to the wheels 1020 and 1045, the wheel-base width of the agricultural vehicle (e.g., the distance between the wheel 1020 and the wheel 1045 which may be on the same axle or a different axle), a known or determined crop row spacing Rs, a target offset $D_o$, and wheel angle sensor readings $\theta_{was}$. In an example the offset error $E_{rr}$ and the heading error $\theta_H$ are determined using equations (6), (7), and (8):

$$E_{rr} = (D_w \% \ r_s + 2ir_s + 2D_o) \frac{[D_L \cos(\theta_{was} + \theta_m)]^2 - [D_R \cos(\theta_{was} - \theta_m)]^2}{D_L D_R \cos(\theta_{was} + \theta_m)\cos(\theta_{was} - \theta_m)} \quad (6)$$

$$+D_R[\tan(\theta_{was}+\theta_m)-\sin(\theta_{was}-\theta_m)]$$

$$+D_L[\tan(\theta_{was}-\theta_m)-\sin(\theta_{was}-\theta_m)]$$

$$\theta_H = \tan^{-1}\left(\tan(\theta_{was} - \theta_m) - \frac{D_w \% \ R_s + 2iR_s + 2D_o + E_{rr}}{D_R \cos(\theta_{was} - \theta_m)}\right) \quad (7)$$

$$\theta_H = \tan^{-1}\left(\tan(\theta_{was} + \theta_m) - \frac{D_w \% \ R_s + 2iR_s + 2D_o - E_{rr}}{D_L \cos(\theta_{was} + \theta_m)}\right) \quad (8)$$

where, $D_R$ and $D_L$ are distances to adjacent crop rows as measured relative to the right wheel 1020 and the left wheel 1045 (e.g., distances along scan line 1025 and 1030), respectively, and $D_o$ is specified at calibration, through user input or optionally changes, for instance according to vehicle roll angle. The remaining variables are obtained or defined as previously described herein.

Crop Row Curvature for Steering Enhancement

The present subject matter provides a system for determining crop row curvature and using the determined crop row curvature for enhanced steering controller performance in curved crop rows or furrows. In various embodiments, the system uses vehicle dynamics, such as kinematics, to determine crop row curvature. In one embodiment, heading error (or the change in vehicle frame relative to crop rows) is determined by the system, a change in heading error per time is determined by taking a derivative of the heading error, and the change in heading error per time is used to determine an estimate of crop row curvature.

In one example, crop row curvature can be estimated based on the estimate of change in heading error per time. In various embodiments, when the rate of change in heading error ϕ (e.g., TKE) of the vehicle relative to the crop rows, over time interval T, differs from the expected rate of change in heading error measured by the yaw rate ω of the vehicle, the current curvature C of the crop rows may be determined by dividing the difference by the current vehicle speed v. After determining an estimate of the change in heading error (by taking a derivative, for example), an estimate of crop row curvature C may be derived using the following equation:

$$C = \frac{w + \frac{\Delta\phi}{T}}{v}$$

The measured value of $\Delta\phi$ may include a noise component, so C may be filtered using a time constant $$\tau = t_{delay} = \frac{F}{v}$$

to remove noise and provide the appropriate delay corresponding to a filter delay F and the distance between the sensors and the rear axle using the equations:

$$C_{f,k} = C_{f,k-1} + \frac{T}{(t_{delay} + T)}(C_k - C_{f,k-1})$$

$$C_{f,k} = C_{f,k-1} + \frac{v_k T}{(F + v_k T)}(C_k - C_{f,k-1})$$

Figure 7:
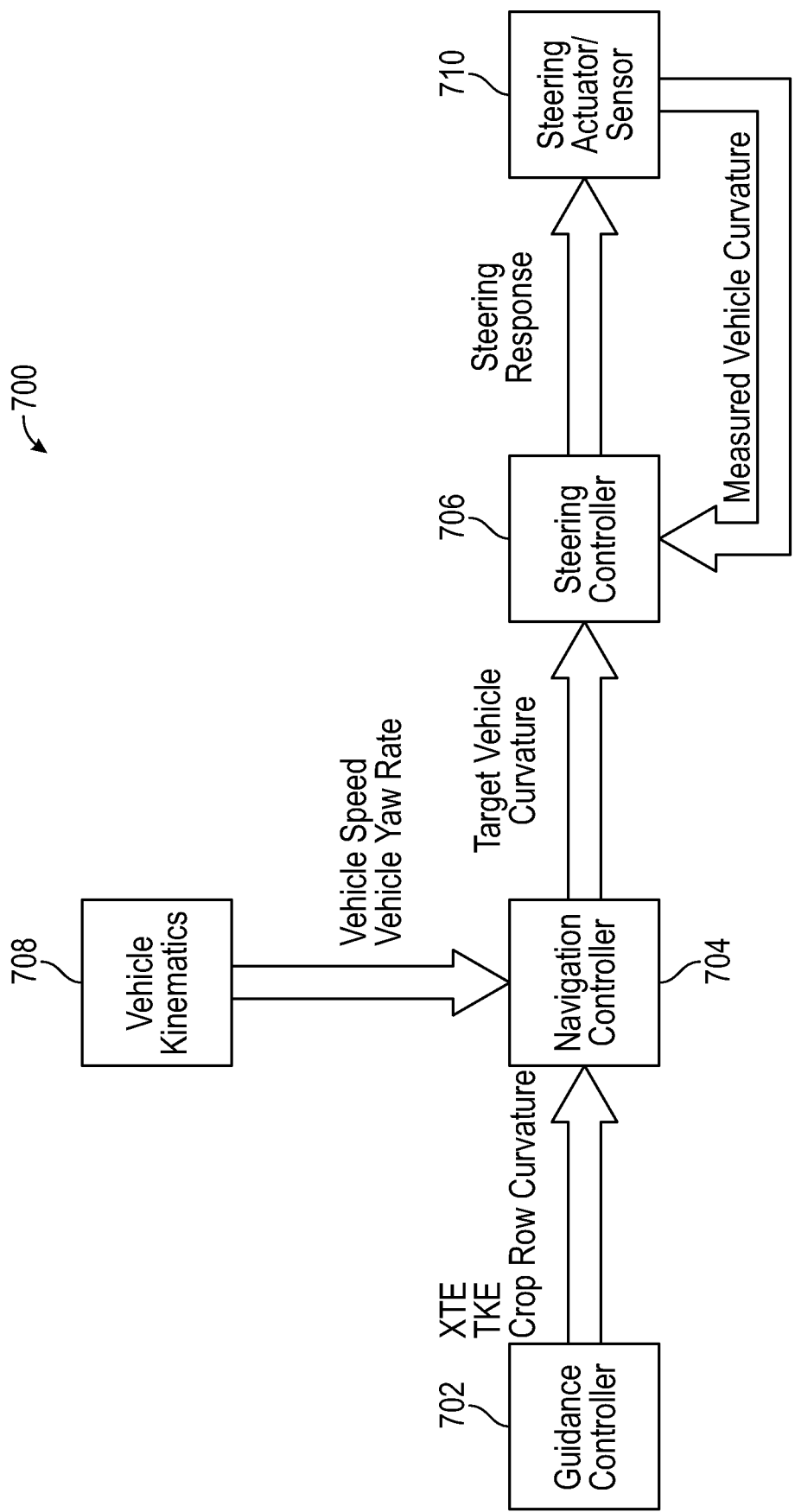
FIG. 7 is a block diagram of a curvature sensing and guidance control system for an agricultural vehicle, according to various embodiments of the present subject matter.

FIG. 7 is a block diagram of a curvature sensing and guidance control system 700 for an agricultural vehicle, according to various embodiments of the present subject matter. The system 700 includes guidance controller 702 configured to determine vehicle positioning based on sensor input. In various embodiments, the guidance controller 702 may receive input from sensors attached to the agricultural machine and determine a cross track error (XTE), a heading error (TKE) and a crop row curvature C, discussed above. The guidance controller 702 may transfer the determined XTE, TKE and crop row curvature to a navigation controller 704, in various embodiments. In various embodiments, XTE may be determined by taking the difference between the middle of the closest row and the vehicle position in the row. In various embodiments, TKE may be determined by taking the difference between the heading (angle) of the closest row and the vehicle heading in the row. In various embodiments, a curvature error may be determined by taking the difference between the vehicle curvature (which may be determined from wheel angle and wheel base (distance between the front and rear axles), yaw rate and speed, or a combination of the two) and the determined crop row curvature C. The navigation module, or navigation controller 704, may include a comparator to determine the curvature error, in various embodiments.

The navigation controller 704 may calculate a target vehicle curvature based on the vehicle kinematics 708 (such as velocity and/or yaw rate), the XTE, the TKE, and the determined crop row curvature (as calculated above). In various embodiments, projections of XTE and TKE may be calculated as a function of curvature and used as inputs to the target vehicle curvature. In one embodiment, the curvature error (or curvature offset) is used in a projection of XTE and TKE by the guidance controller 702. In this embodiment, the navigation controller 704 calculates the target curvature of the vehicle using the projected XTE, the projected TKE, the curvature offset, and the vehicle velocity and yaw rate.

Various gains or coefficients may be used to calculate the target vehicle curvature and to assess an effect of various components on the calculated curvature, in various embodiments. In various embodiments, the navigation controller 704 may modulate (e.g., maintain, change, adjust, decrease, increase or the like) the gains or coefficients to decrease the measured XTE and TKE. In some embodiments, if the crop row curvature is provided, the controller may guide both XTE and TKE to zero and guide the actual target curvature to be equal to the crop row curvature, such that the wheel curvature will be applied to track the crop row curvature. The resulting target curvature may be passed from the navigation controller 704 to the steering controller 706 to provide control to the steering actuator 710 of the agricultural vehicle, in various embodiments. According to various embodiments, the steering controller 706 may determine a steering controller output equal to the difference between the calculated target vehicle curvature and a measured vehicle curvature fed back from the steering actuator 710.

Figure 8A:
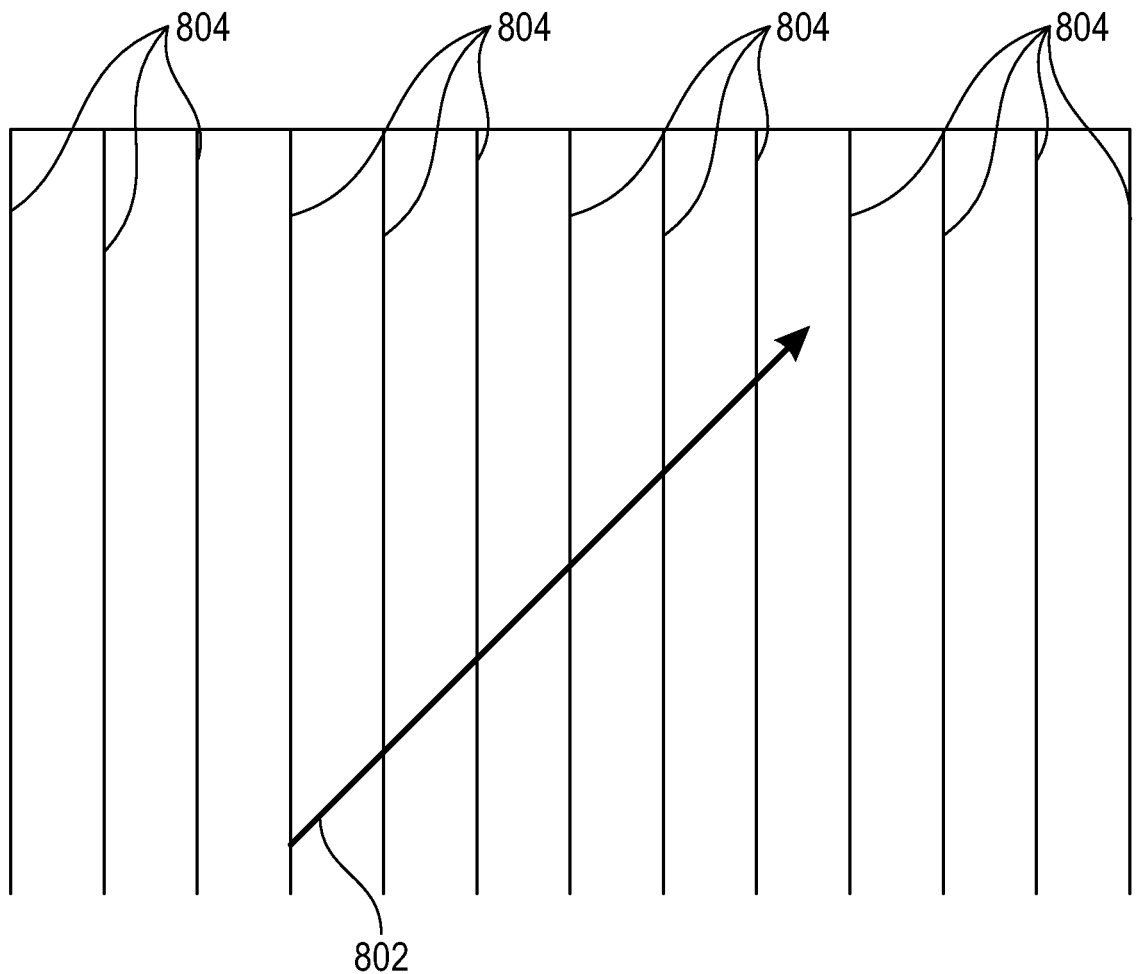
FIG. 8A is a top view of a straight path of an agricultural vehicle through straight crop rows, according to various embodiments of the present subject matter.

FIG. 8A is a top view of a straight vehicle path 802 of an agricultural vehicle through straight crop rows 804, according to various embodiments of the present subject matter. The arrow depicts a straight path of the vehicle with zero yaw rate in straight rows, such that the change in heading error between successive lines is zero, which results in an estimated curvature of zero using the above equation.

Figure 8B:
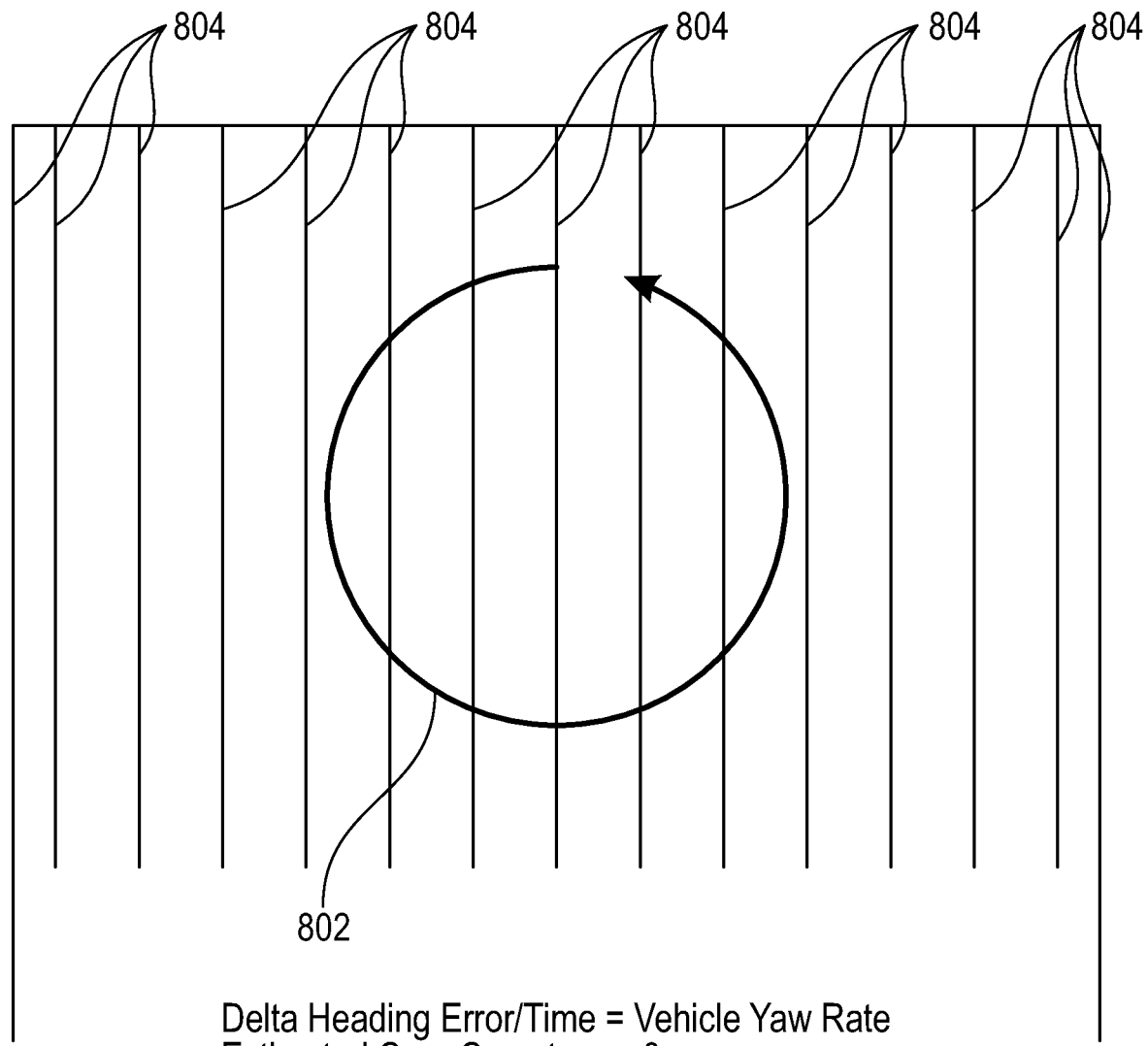
FIG. 8B is a top view of a curved path of an agricultural vehicle through straight crop rows, according to various embodiments of the present subject matter.

FIG. 8B is a top view of a curved vehicle path 802 of an agricultural vehicle through straight crop rows 804, according to various embodiments of the present subject matter.

The arrow depicts a curved path of the vehicle at constant yaw rate in straight rows, such that the change in heading error is at the same rate as the change in vehicle yaw rate, which results in an estimated curvature of zero using the above equation.

Figure 8C:
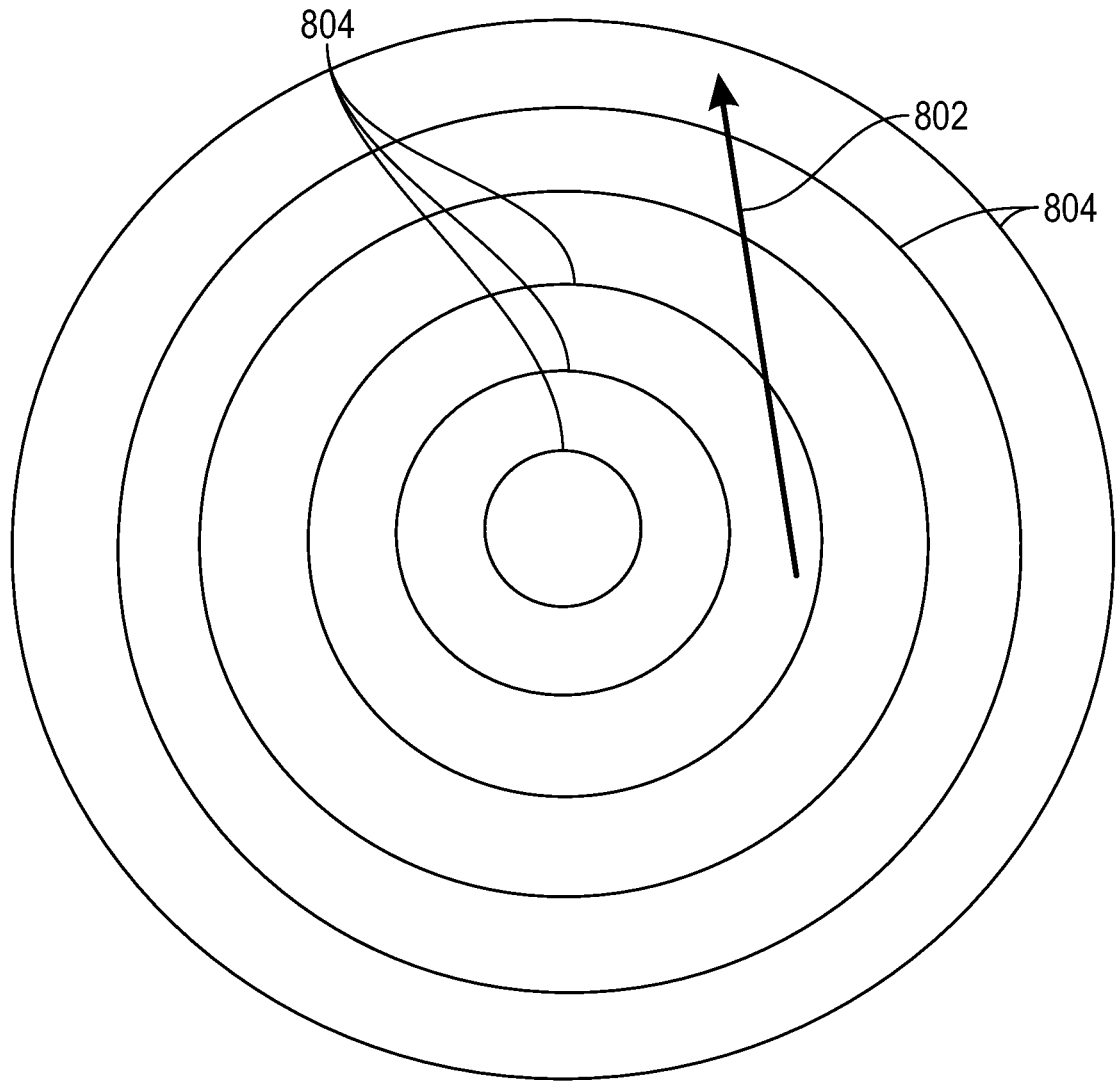
FIG. 8C is a top view of a straight path of an agricultural vehicle through curved crop rows, according to various embodiments of the present subject matter.

FIG. 8C is a top view of a straight vehicle path 802 of an agricultural vehicle through curved crop rows 804, according to various embodiments of the present subject matter. The arrow depicts a straight path of the vehicle such that the change in heading error will gradually decrease as the vehicle moves outward from the center of the circle. The yaw rate of the vehicle in this condition is equal to zero and as a result the curvature of the rows is estimated to be the change in heading error as a function of time divided by velocity of the vehicle, using the above equation.

Figure 8D:
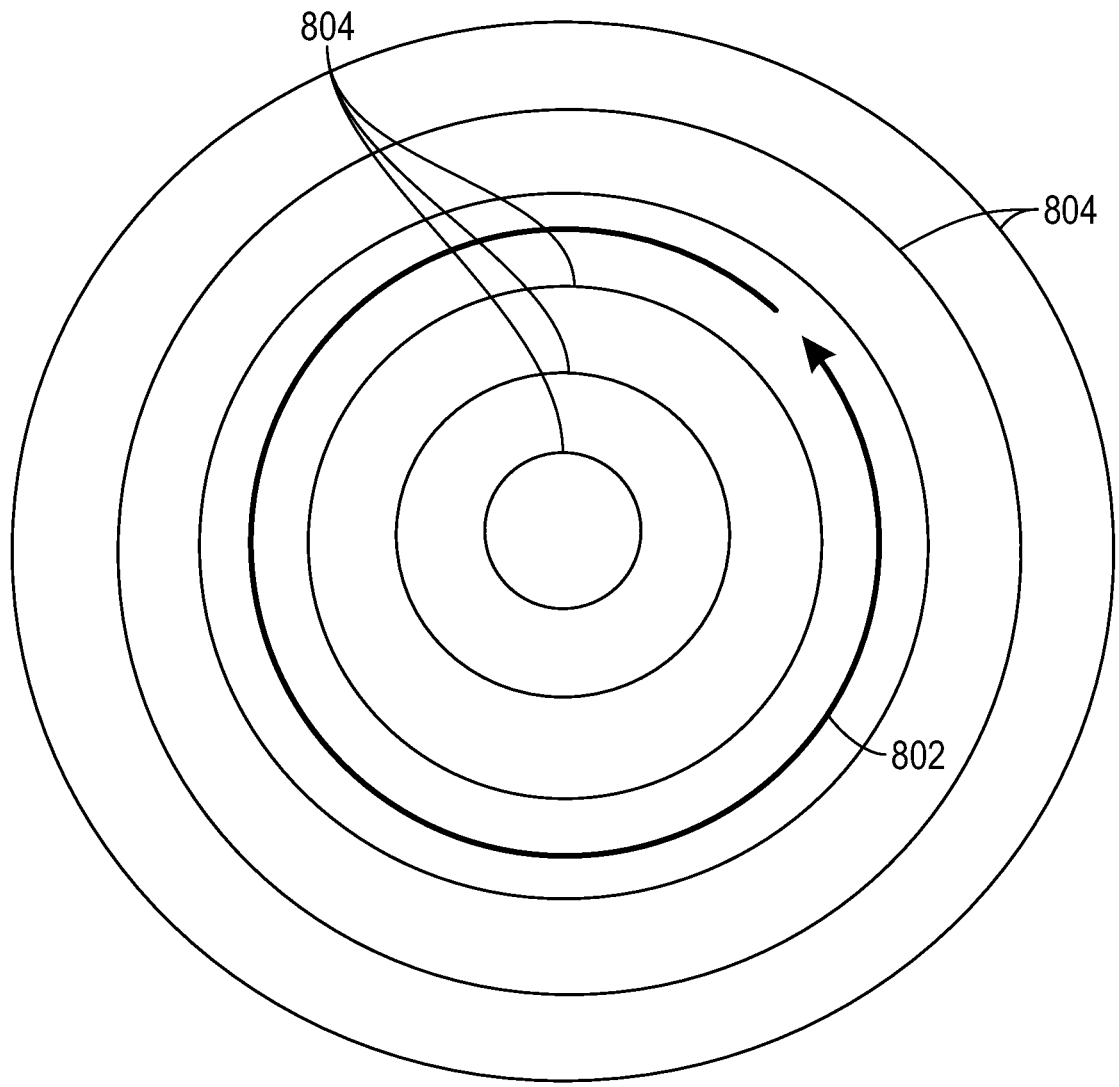
FIG. 8D is a top view of a curved path of an agricultural vehicle through curved crop rows, according to various embodiments of the present subject matter.

FIG. 8D is a top view of a curved vehicle path 802 of an agricultural vehicle through curved crop rows 804, according to various embodiments of the present subject matter. The arrow depicts a curved path of the vehicle at the same curvature as the curvature of the rows, such that the change in heading error is zero. In this condition, the yaw rate of the vehicle divided by the velocity of the vehicle is used to estimate the curvature of the row, using the above equation.

Crop rows are not always straight or curved, but transition between straight and curved rows. To ensure that the wheels of the vehicle stay in the row during the transition, the estimated row curvature may be filtered back in time to the desired rotation point on the vehicle. Using a determined distance from row detection sensors to a desired rotation point on the vehicle, a time constant of projection distance divided by vehicle speed can be calculated that provides a distance-based filter to smooth and phase shift the steering input based on the estimated curvature. Using the determined time constant ensures that steering input based on the estimated curvature is applied at the correct time when transitioning through a dynamically changing crop row curvature.

In various examples, the present subject matter uses a curvature for steering the agricultural vehicle derived using the present system, which is the measured row curvature at the rear axle. In some examples, the present subject matter uses a curvature derived using a scaled filter delay (where filter delay is represented by F in the above equation), which is used to transform camera TKE and XTE to rear-axle TKE and XTE, respectively. In some examples, F is scaled by ½ to transform camera TKE to rear-axle TKE, and F is scaled by ⅓ to transform camera XTE to rear-axle XTE, which results in the filter gain [v_k*T/(F+v_k*T)] being scaled by approximately 2 or 3 at low speeds (v_k*T<<F).

In various examples, these smaller (scaled) filter delay (larger filter gain) values produce curvature values that, when used to derive rear-axle XTE/TKE, results in rear-axle XTE/TKE values that are more accurate on average when the curve has a constant curvature change rate. The values are optimally improved using ½ and ⅓ as scaling factors for the filter delay for TKE and XTE, respectively, and performance does not improve further as those numbers are decreased. Also, as with any filter, decreasing the filter delay has a side-effect of increasing the amount of noise in the output. Other filter gains may be used without departing from the scope of the present subject matter. In various examples, scaling the filter delay as described above provides for improved performance on changing curves and equivalently on constant curves, and may alter the positioning of the machine in the row to reduce error.

According to various embodiments, a continuous TKE calibration may be used that subtracts error in the measured camera TKE due to non-zero crop height on curves. In various embodiments, the continuous TKE calibration is performed by: a) predicting the current XTE based on previous state (XTE/TKE/row curvature/vehicle curvature); b) measuring the current XTE; c) computing the instantaneous TKE measurement error [TKE_error=(XTE_measured−XTE_predicted)/distance_change]; d) performing a low-pass filter for the TKE error (filter gain is distance-based and can be tuned); and e) subtracting the filtered TKE error from the final TKE value. The continuous TKE calibration may compensate for errors in field calibration, in some embodiments. In various examples, since the curve algorithm is filter based, the present system may gradually zero out the filter state when the solution quality drops, so that the system can smoothly ride through short disturbances (e.g., small weed patch) but start fresh after a long disturbance (e.g., large washout or headland turn-around).

Figure 9:
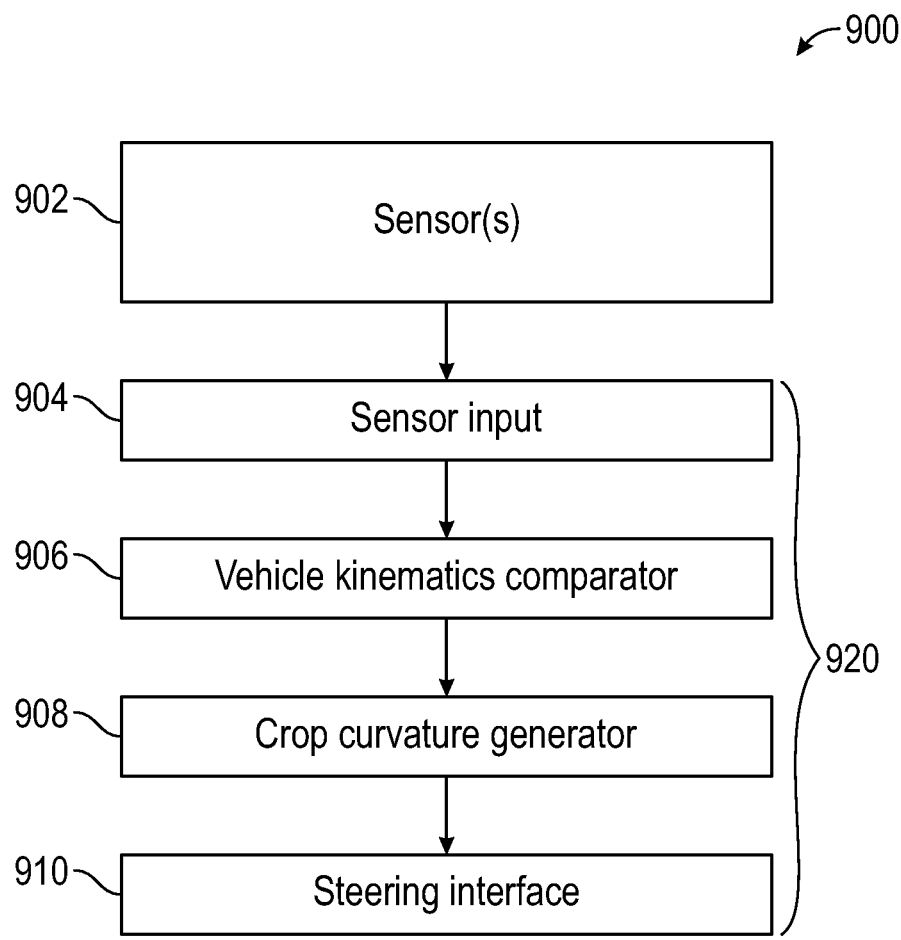
FIG. 9 is a flow diagram of a method for curvature sensing and guidance control for an agricultural vehicle, according to various embodiments of the present subject matter.

FIG. 9 is a block diagram of a curvature sensing and guidance control system 900 for an agricultural vehicle, according to various embodiments of the present subject matter. The system 900 includes one or more sensors 902 configured for coupling with an agricultural vehicle, the one or more sensors configured to determine kinematics of the agricultural vehicle including, but not limited to, detecting kinematic values and deriving kinematic values from detected values. The system 900 includes a guidance control module 920 configured to coordinate steering of one or more steering mechanisms of the agricultural vehicle. The guidance control module 920 includes a sensor input 904 configured to receive determined kinematics of the agricultural vehicle, a vehicle kinematics comparator 906 configured to determine one or more error values using the received vehicle kinematics, a crop curvature generator 908 configured to determine crop row curvature using the one or more error values, and a steering interface 910 configured to provide instructions to the vehicle steering controller to guide the agricultural vehicle using the crop row curvature.

Figure 10:
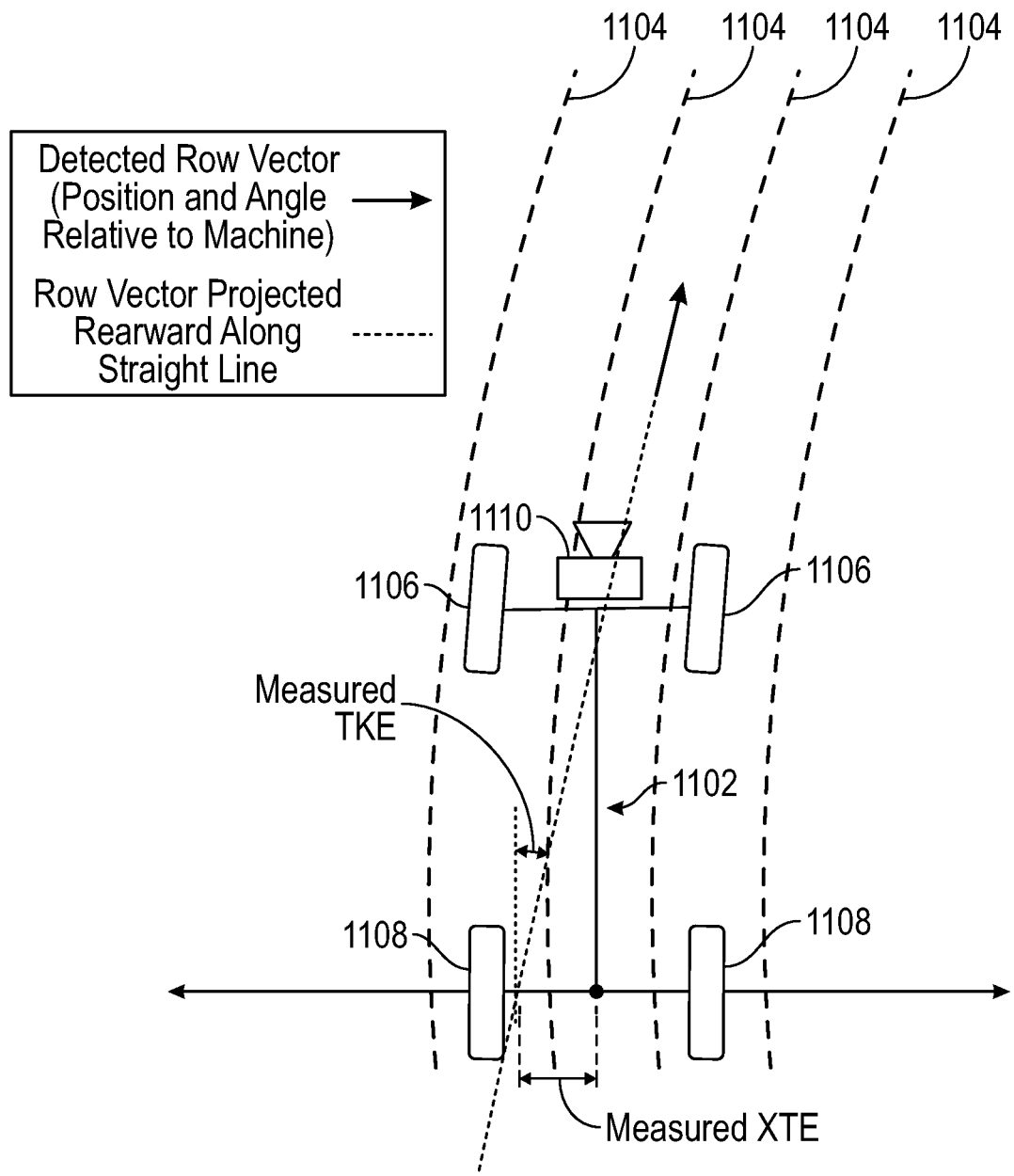
FIG. 10 is a top view of a guidance error projection for an agricultural vehicle using a straight row model, according to various embodiments.

FIG. 10 is a top view of a guidance error projection for an agricultural vehicle 1102 having front wheels 1106, rear wheels 1108, and a guidance control module 1110 using a straight row model, according to various embodiments. The depicted embodiment illustrates steering control without using the crop row curvature estimation of the present subject matter, and shows the detected row vector or position and angle of the crop row 1104 relative to the machine, and the row vector projected along a straight line. When the actual XTE and TKE are zero and the actual vehicle curvature matches the crop row curvature, the vehicle will stay on track only if the target vehicle curvature is equal to the crop row curvature. On the curve illustrated in FIG. 10, when the detected row vector is projected to a control point (the rear axle) along a straight line, the measured TKE will be a large positive value and the measured XTE will be a large negative value. Using these as inputs, the navigation controller may produce a target vehicle curvature equal to the crop row curvature only with an exact combination of controller gains and vehicle speed. Since this prior system does not use the estimated crop row curvature in the calculation, as the vehicle moves along the row, the system will reach a steady state where the actual vehicle curvature may be greater than the crop row curvature (such that the vehicle will be aligned right of center), or may be less than the crop row curvature (such that the vehicle will be aligned left of center). If the curvature mismatch is large enough, the vehicle will drive over crops and the system may erroneously skip to the next row.

Figure 11:
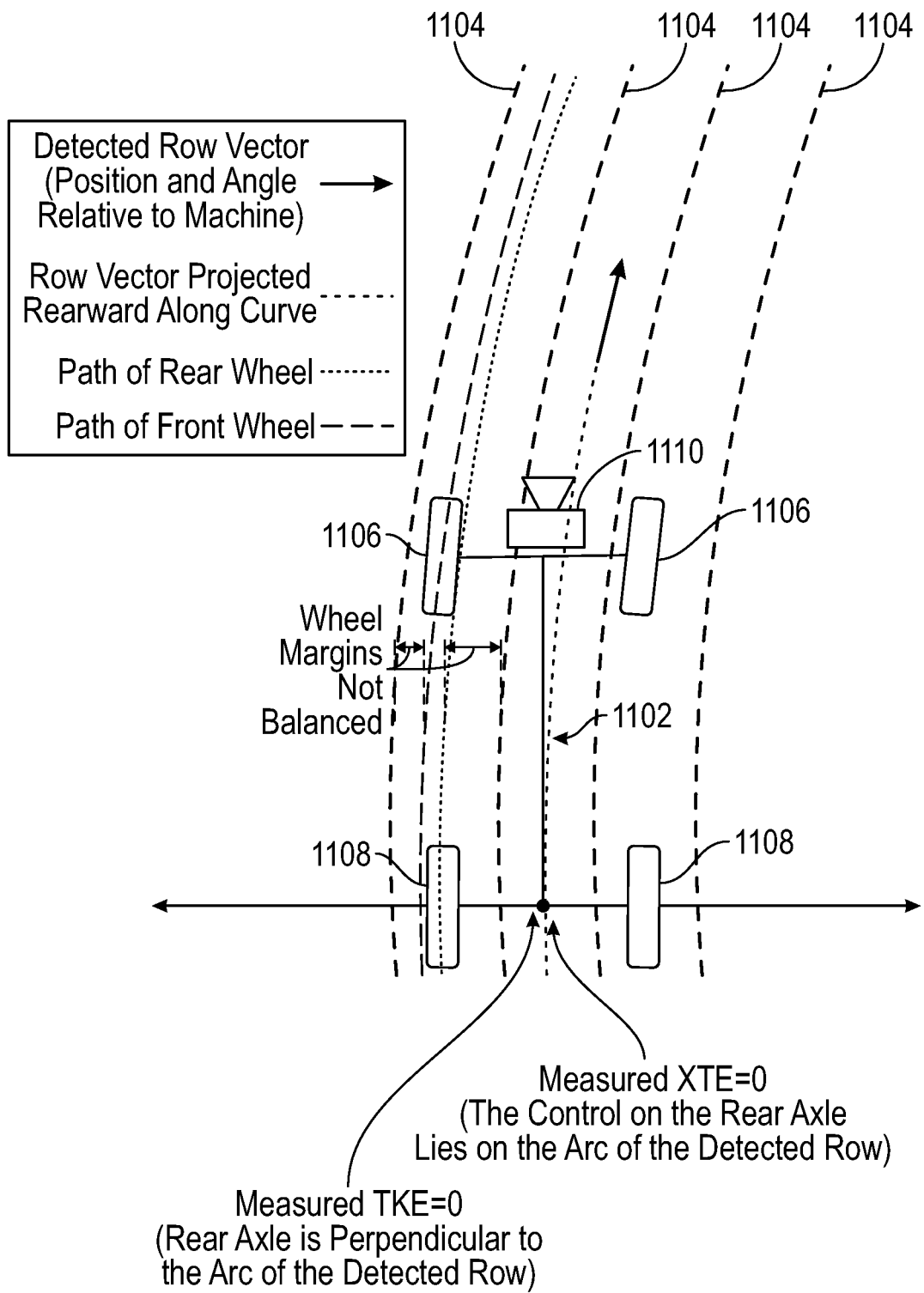
FIG. 11 is a top view of a guidance error projection for an agricultural vehicle using a row curvature model, according to various embodiments.

FIG. 11 is a top view of a guidance error projection for an agricultural vehicle 1102 having front wheels 1106, rear wheels 1108, and a guidance control module 1110 using a row curvature model, according to various embodiments. The depicted embodiment illustrates steering control using the crop row curvature estimation of the present subject matter, and shows the detected row vector or position and angle of the crop row 1104 relative to the machine, the row vector projected rearward along a curve, the path of the rear wheel and the path of the front wheel. By projecting the row vector rearward to the rear axle along the calculated curvature of the row, the XTE, TKE and curvature error may approach zero. However, for a front-steered vehicle on a curved path, the front wheels trace a curve with a larger radius than that of the rear wheels, and since the rear wheels are controlled to the center of the row, the wheel margins are not balanced. As curvature increases, the difference in radius may be large enough to cause the front wheels of the vehicle to run over and damage crops.

Multi-Axle Wheel Track Centering (MAWTC) and Projection

Figure 12:
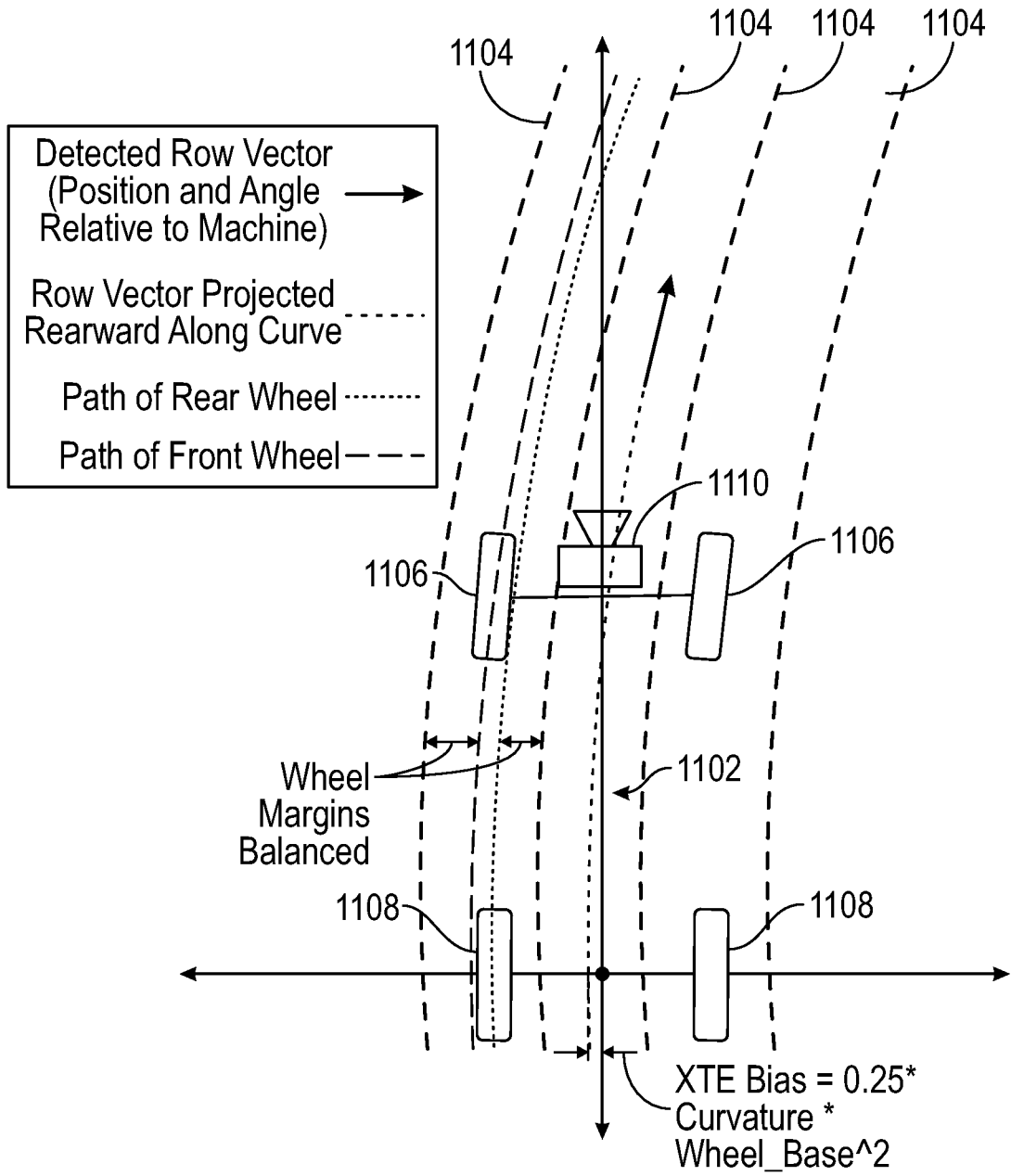
FIG. 12 is a top view of a guidance error projection for an agricultural vehicle using a row curvature model and using multi-axle wheel track centering for a two-wheel steer vehicle, according to various embodiments.

FIG. 12 is a top view of a guidance error projection for an agricultural vehicle 1102 having front wheels 1106, rear wheels 1108, and a guidance control module 1110 using a row curvature model and using multi-axle wheel track centering for a two-wheel steer vehicle, according to various embodiments. The depicted embodiment illustrates steering control using the crop row curvature estimation and MAWTC of the present subject matter, and shows the detected row vector or position and angle of the crop row 1104 relative to the machine, the row vector projected rearward along a curve, the path of the rear wheel and the path of the front wheel. In various embodiments, the navigation module (such as navigation block 704) includes a projection module configured to implement MAWTC to add a projection bias to the projected XTE, the value of the bias being calculated based on the calculated curvature and the distance between the rear axle and the front axle. By adding this bias to the projected XTE, the target position of the machine can be moved from the center of the furrow to a position some distance to the left or right of center, such that the distance from the rear wheel to the inner crop row equals the distance from the front wheel to the outer crop row. This applied projection bias of the MAWTC algorithm balances the wheel margins and, when used with the crop row curvature steering of the present subject matter discussed above, provides for the front and rear wheels to maintain a curvature radius that keeps the front and rear wheels within the crop row. Various embodiments of the present subject matter are configured to implement MAWTC to add a projection bias to the XTE and thus project the XTE from one of a front axle or rear axle to the other of the rear axle or the front axle for enhanced two-wheel steering of the agricultural vehicle. In some embodiments, MAWTC includes applying a bias associated with the rear axle such that the front wheels are positioned proximate to the crop row in a manner that still minimizes incidental crop damage (for instance used for 2 wheel steering). In some embodiments, wheel margins of front and rear wheels are balanced, which compromises rear wheel position to improve front wheel position. MAWTC may be based on a projected XTE to rear axle from sensor or based on a measured XTE at the rear axle, in various embodiments. As discussed herein, other errors and measurements may be projected from a sensor location to a selected or programmable control reference point to improve vehicle guidance.

Figure 13:
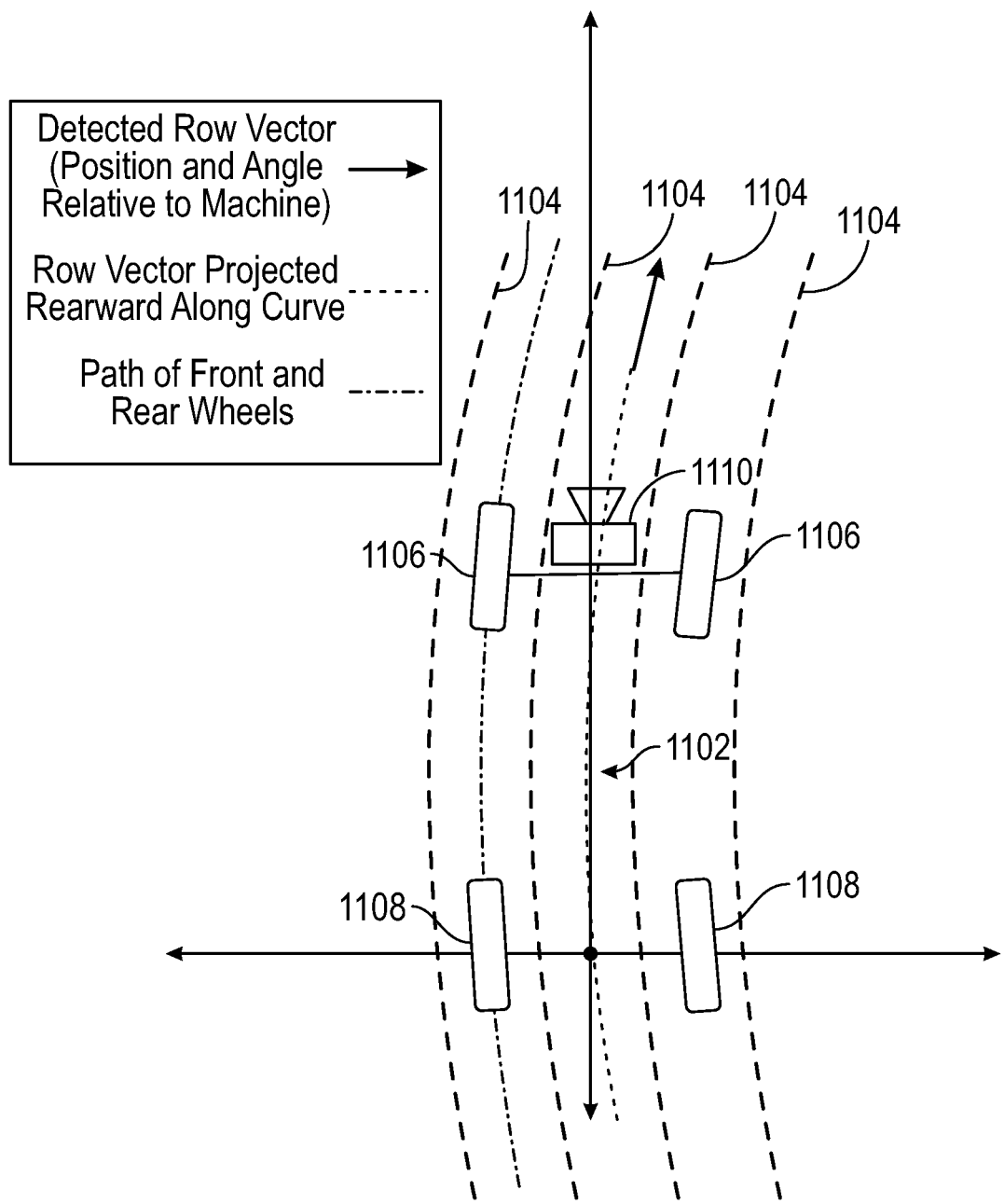
FIG. 13 is a top view of a guidance error projection for an agricultural vehicle using a row curvature model for a four-wheel steer vehicle, according to various embodiments.

FIG. 13 is a top view of a guidance error projection for an agricultural vehicle 1102 having front wheels 1106, rear wheels 1108, and a guidance control module 1110 using a row curvature model for a four-wheel steer vehicle, according to various embodiments. The depicted embodiment illustrates steering control for a four-wheel steer vehicle using the crop row curvature estimation of the present subject matter, and shows the detected row vector or position and angle of the crop row 1104 relative to the machine, the row vector projected rearward along a curve, and the path of the front and rear wheels. By projecting the row vector rearward to the rear axle along the calculated curvature of the row, the XTE, TKE and curvature error may approach zero. Since the rear wheel may be steered using the crop row curvature estimation translated back to the rear axle to follow the crop row curvature, applying the projection bias of MAWTC is not needed (but may be used) along with the target curvature to maintain the front and rear wheels between the crop rows.

Computational Machine

Figure 14:
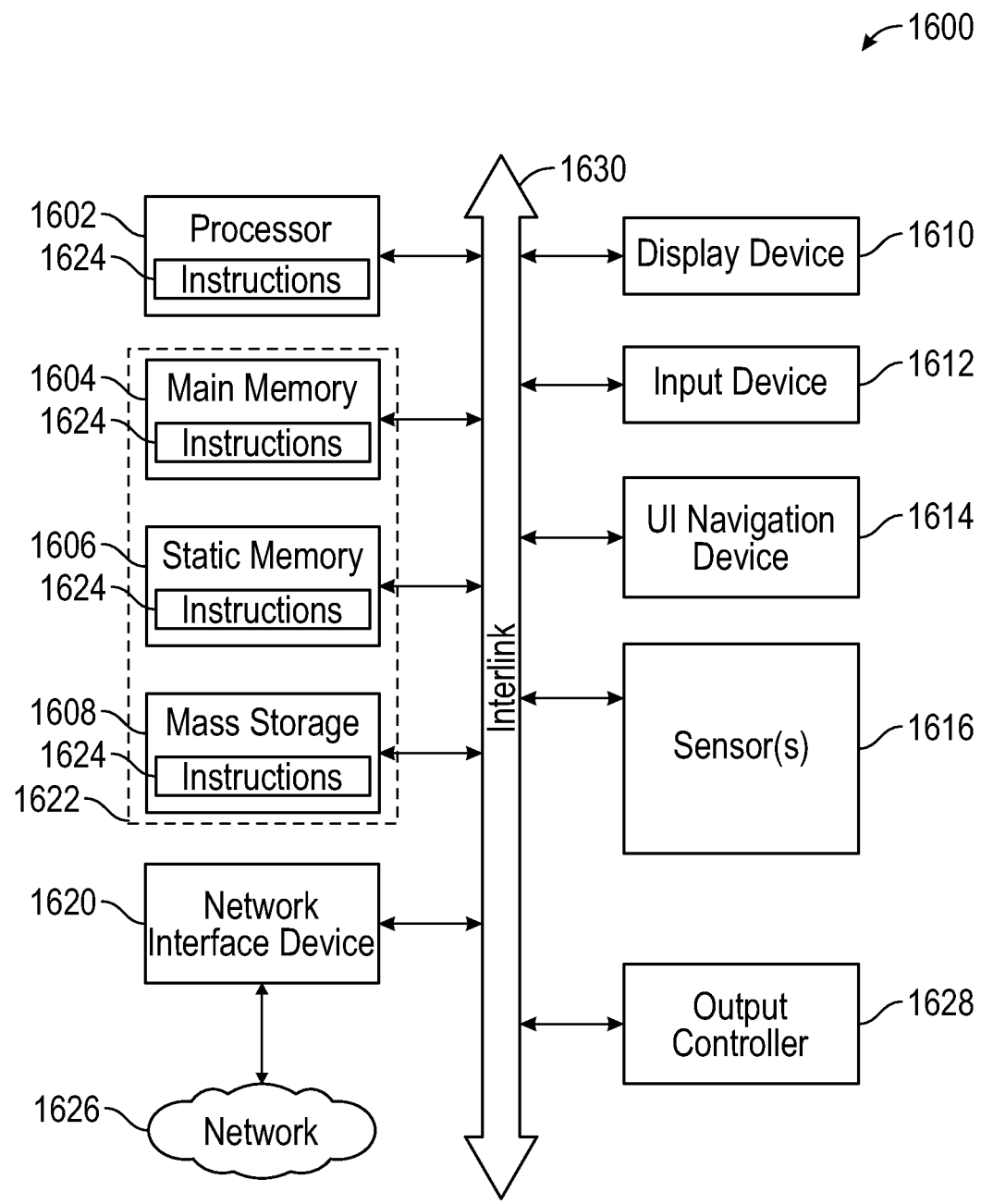
FIG. 14 illustrates a block diagram of an example machine upon which any one or more of the techniques (e.g., methodologies) discussed herein can perform.

FIG. 14 illustrates a block diagram of an example machine 1600 upon which any one or more of the techniques (e.g., methodologies) discussed herein can perform. Examples, as described herein, can include, or can operate by, logic or a number of components, or mechanisms in the machine 1600. Circuitry (e.g., processing circuitry) is a collection of circuits implemented in tangible entities of the machine 1600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1600 follow.

In alternative embodiments, the machine 1600 can operate as a standalone device or can be connected (e.g., networked) to other machines. In a networked deployment, the machine 1600 can operate in the capacity of a server machine, a client machine, or both in server-client network environments. In an example, the machine 1600 can act as a peer machine in peer-to-peer (P2P) (or other distributed) network environment. The machine 1600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein (e.g., authenticating transmissions from machines in a job group, generating coverage maps and reports, relaying coverage data, capturing and conditioning sensor information, such as generated by the sensors 155 or 175, and generating guidance information to avoid double coverage of field being processed), such as cloud computing, software as a service (SaaS), other computer cluster configurations.

The machine (e.g., computer system) 1600 can include a hardware processor 1602 (e.g., a central processing unit (CPU), a graphics processing unit (GPU), a hardware processor core, or any combination thereof), a main memory 1604, a static memory (e.g., memory or storage for firmware, microcode, a basic-input-output (BIOS), unified extensible firmware interface (UEFI), etc.) 1606, and mass storage 1608 (e.g., hard drive, tape drive, flash storage, or other block devices) some or all of which can communicate with each other via an interlink (e.g., bus) 1630. The machine 1600 can further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 can be a touch screen display. The machine 1600 can additionally include a storage device (e.g., drive unit) 1608, a network interface device 1620, and one or more sensors 1616, such as a global positioning system (GPS) sensor, compass, accelerometer, or other sensor. The machine 1600 can include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1602, the main memory 1604, the static memory 1606, or the mass storage 1608 can be, or include, a machine readable medium 1622 on which is stored one or more sets of data structures or instructions 1624 (e.g., software) embodying or utilized by any one or more of the techniques or functions described herein. The instructions 1624 can also reside, completely or at least partially, within any of registers of the processor 1602, the main memory 1604, the static memory 1606, or the mass storage 1608 during execution thereof by the machine 1600. In an example, one or any combination of the hardware processor 1602, the main memory 1604, the static memory 1606, or the mass storage 1608 can constitute the machine readable media 1622. While the machine readable medium 1622 is illustrated as a single medium, the term "machine readable medium" can include a single medium or multiple media (e.g., a centralized or distributed database, and/or associated caches and servers) configured to store the one or more instructions 1624.

The term "machine readable medium" can include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 can be further transmitted or received over a communications network. 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 1620 can include one or more physical jacks (e.g., Ethernet, coaxial, or phone jacks) or one or more antennas to connect to the communications network 1626. In an example, the network interface device 1620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1600, and includes digital or analog communications signals or other intangible medium to facilitate communication of such software. A transmission medium is a machine readable medium.

Additional Notes & Examples

Example 1 is a system for operating an agricultural vehicle, the system comprising: one or more sensors configured for coupling with the agricultural vehicle, the one or more sensors configured to determine kinematics of the agricultural vehicle relative to a crop row; and a guidance control module configured to coordinate steering of one or more steering mechanisms of the agricultural vehicle to guide the agricultural vehicle, the guidance control module includes: a sensor input configured to receive determined kinematics of the agricultural vehicle from the one or more sensors; a vehicle kinematics comparator configured to determine one or more error values using the vehicle kinematics; a crop curvature generator configured to determine crop row curvature using at least one of the one or more error values; and a steering interface configured to interface with a vehicle steering controller to provide instructions to the vehicle steering controller to guide the agricultural vehicle using the crop row curvature.

In Example 2, the subject matter of Example 1 includes, wherein the one or more error values include one or more of a heading error (TKE) and a cross track error (XTE), and the vehicle kinematics comparator is configured to determine one or more of the TKE or the XTE of the agricultural vehicle.

In Example 3, the subject matter of Example 2 includes, wherein the guidance control module is configured to determine the crop row curvature using at least the heading error (TKE).

In Example 4, the subject matter of Example 2 includes, further comprising a projection module configured to generate a projection bias of one or more of the TKE, the XTE, or the crop row curvature from a position of the one or more sensors to a control reference point of the agricultural vehicle.

In Example 5, the subject matter of Example 4 includes, wherein the control reference point of the agricultural vehicle includes one of a front axle or a rear axle of the agricultural vehicle.

In Example 6, the subject matter of Example 2 includes, wherein the projection bias is determined using an arc length between the position of the one or more sensors and the control reference point.

In Example 7, the subject matter of Examples 1-6 includes, wherein the kinematics include one or more of yaw rate or velocity of the agricultural vehicle, and the one or more sensors are configured to determine one or more of the yaw rate or velocity.

In Example 8, the subject matter of Example 7 includes, wherein the crop curvature generator is configured to determine an estimate of a rate of change in the heading error (TKE).

In Example 9, the subject matter of Example 8 includes, wherein the crop curvature generator is configured to determine the crop row curvature by adding the yaw rate to the estimate of the rate of change in the heading error (TKE), and dividing by the velocity.

In Example 10, the subject matter of Examples 1-9 includes, wherein the one or more steering mechanisms include first and second steering mechanisms corresponding with front and rear axles of the agricultural vehicle.

In Example 11, the subject matter of Example 1 includes, wherein the one or more sensors include one or more of optical, video, spectrometric, RGB (red-green-blue), thermographic, hyperspectral, ground penetrating radar, radar, LIDAR or ultrasound sensors.

Example 12 is a method of coordinating steering of one or more steering mechanisms of an agricultural vehicle, the method comprising: receiving kinematics of the agricultural vehicle from one or more sensors configured for coupling with the agricultural vehicle; determining one or more error values using the vehicle kinematics; determining crop row curvature using at least one of the one or more error values; and providing instructions to a vehicle steering controller to guide the agricultural vehicle using the crop row curvature.

In Example 13, the subject matter of Example 12 includes, wherein the vehicle kinematics include a yaw rate and a velocity of the agricultural vehicle, and receiving detected kinematics includes receiving one or more of yaw rate or velocity from the one or more sensors.

In Example 14, the subject matter of Example 13 includes, wherein determining the one or more error values includes determining a heading error (TKE) of the agricultural vehicle.

In Example 15, the subject matter of Example 14 includes, wherein determining the crop row curvature includes determining an estimate of a rate of change in the heading error (TKE).

In Example 16, the subject matter of Example 15 includes, wherein determining the crop row curvature includes adding the yaw rate to the estimate of the rate of change in the heading error (TKE), and dividing by the velocity.

In Example 17, the subject matter of Example 15 includes, wherein determining the estimate of the rate of change in the heading error (TKE) includes taking a derivative of the heading error (TKE).

In Example 18, the subject matter of Examples 12-17 includes, wherein determining the crop row curvature further comprises: filtering the crop row curvature using a time delay constant based on a distance between the one or more sensors and a control reference point of the agricultural vehicle.

In Example 19, the subject matter of Examples 12-18 includes, wherein determining the one or more error values includes determining a curvature error, and wherein providing instructions to the vehicle steering controller includes using the curvature error and the crop row curvature.

In Example 20, the subject matter of Examples 12-19 includes, wherein determining the one or more error values includes determining a heading error (TKE), a position error and a curvature error, and wherein providing instructions to the vehicle steering controller includes using the heading error, the position error, the curvature error and the crop row curvature.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for operating an agricultural vehicle, the system comprising:
   one or more sensors configured for coupling with the agricultural vehicle, the one or more sensors configured to determine kinematics of the agricultural vehicle relative to a crop row; and
   one or more processors configured to coordinate steering of one or more steering mechanisms of the agricultural vehicle to guide the agricultural vehicle, the one or more processors configured to:
      receive determined kinematics of the agricultural vehicle from the one or more sensors;
      determine a heading error (TKE) of the agricultural vehicle using the determined vehicle kinematics;
      determine crop row curvature using the determined heading error (TKE);
      provide instructions to guide the agricultural vehicle using the crop row curvature; and
      automatically steer the agricultural vehicle based on the instructions.

2. The system of claim 1, wherein the one or more processors are configured to determine a cross track error (XTE) of the agricultural vehicle, and the one or more processors are configured to determine the crop row curvature using the XTE of the agricultural vehicle.

3. The system of claim 2, wherein the one or more processors are further configured to generate a projection bias of one or more of the TKE, the XTE, or the crop row curvature from a position of the one or more sensors to a control reference point of the agricultural vehicle.

4. The system of claim 3, wherein the control reference point of the agricultural vehicle includes one of a front axle or a rear axle of the agricultural vehicle.

5. The system of claim 3, wherein the projection bias is determined using an arc length between the position of the one or more sensors and the control reference point.

6. The system of claim 1, wherein the kinematics include one or more of yaw rate or velocity of the agricultural vehicle, and the one or more sensors are configured to determine one or more of the yaw rate or velocity.

7. The system of claim 6, wherein the one or more processors are configured to determine an estimate of a rate of change in heading error (TKE).

8. The system of claim 7, wherein the one or more processors are configured to determine the crop row curvature by adding the yaw rate to the estimate of the rate of change in the heading error (TKE), and dividing by the velocity.

9. The system of claim 1, wherein the one or more steering mechanisms include first and second steering mechanisms corresponding with front and rear axles of the agricultural vehicle.

10. The system of claim 1, wherein the one or more sensors include one or more of optical, video, spectrometric, RGB (red-green-blue), thermographic, hyperspectral, ground penetrating radar, radar, LIDAR or ultrasound sensors.

11. A method of coordinating steering of one or more steering mechanisms of an agricultural vehicle, the method comprising:
    receiving kinematics of the agricultural vehicle from one or more sensors configured for coupling with the agricultural vehicle;
    determining a heading error (TKE) of the agricultural vehicle using the received vehicle kinematics;
    determining crop row curvature using the determined heading error (TKE);
    providing instructions to guide the agricultural vehicle using the crop row curvature; and
    automatically steering the agricultural vehicle based on the instructions.

12. The method of claim 11, wherein the vehicle kinematics include a yaw rate and a velocity of the agricultural vehicle, and receiving detected kinematics includes receiving one or more of yaw rate or velocity from the one or more sensors.

13. The method of claim 12, wherein determining the crop row curvature includes determining an estimate of a rate of change in the heading error (TKE).

14. The method of claim 13, wherein determining the crop row curvature includes adding the yaw rate to the estimate of the rate of change in the heading error (TKE), and dividing by the velocity.

15. The method of claim 13, wherein determining the estimate of the rate of change in the heading error (TKE) includes taking a derivative of the heading error (TKE).

16. The method of claim 11, wherein determining the crop row curvature further comprises:
    filtering the crop row curvature using a time delay constant based on a distance between the one or more sensors and a control reference point of the agricultural vehicle.

17. The method of claim 11, further comprising determining a curvature error, and wherein providing instructions includes using the curvature error and the crop row curvature.

18. The method of claim 11, further comprising determining a position error and a curvature error, and wherein providing instructions includes using the heading error, the position error, the curvature error and the crop row curvature.

* * * * *

UNITED STATES PATENT AND TRADEMARK OFFICE
CERTIFICATE OF CORRECTION

PATENT NO. : 12,372,961 B2  
APPLICATION NO. : 18/058669  
DATED : July 29, 2025  
INVENTOR(S) : Rust et al.

Page 1 of 1

It is certified that error appears in the above-identified patent and that said Letters Patent is hereby corrected as shown below:

In the Specification

In Column 1, Line 9, delete "§ 119(e)" and insert --§119(e)-- therefor

In Column 5, Line 40, delete "case" and insert --ease-- therefor

In Column 8, Line 52, delete "crops)," and insert --crops).-- therefor

In Column 20, Line 18, delete "network." and insert --network-- therefor

In the Claims

In Column 25, Lines 5-6, in Claim 18, after "comprising", delete "determining"

Signed and Sealed this  
Twentieth Day of January, 2026

John A. Squires  
*Director of the United States Patent and Trademark Office*